(12) United States Patent
Heyn et al.

(10) Patent No.: US 11,363,545 B2
(45) Date of Patent: Jun. 14, 2022

(54) WIRELESS COMMUNICATION SYSTEM, BASE-STATION AND USER-SIDE-DEVICE

(71) Applicant: Fraunhofer-Gesellschaft zur Förderung der angewandten Forschung e.V., Munich (DE)

(72) Inventors: Thomas Heyn, Fürth (DE); Rohit Datta, Erlangen (DE); Christian Rohde, Erlangen (DE); Elke Roth-Mandutz, Nuremberg (DE)

(73) Assignee: Fraunhofer-Gesellschaft zur Förderung der angewandten Forschung e.V., Munich (DE)

( * ) Notice: Subject to any disclaimer, the term of this patent is extended or adjusted under 35 U.S.C. 154(b) by 0 days.

(21) Appl. No.: 16/797,556

(22) Filed: Feb. 21, 2020

(65) Prior Publication Data
US 2020/0196263 A1 Jun. 18, 2020

Related U.S. Application Data

(63) Continuation of application No. PCT/EP2018/072577, filed on Aug. 21, 2018.

(30) Foreign Application Priority Data

Aug. 22, 2017 (EP) ..................................... 17187318

(51) Int. Cl.
*H04W 56/00* (2009.01)
*H04B 7/185* (2006.01)
*H04B 7/212* (2006.01)

(52) U.S. Cl.
CPC .... *H04W 56/0005* (2013.01); *H04B 7/18508* (2013.01)

(58) Field of Classification Search
CPC .......... H04W 56/0005; H04W 56/0045; H04B 7/18508; H04B 7/2125; H04B 7/18541
See application file for complete search history.

(56) References Cited

U.S. PATENT DOCUMENTS 5,192,957 A * 3/1993 Kennedy ................. G01S 19/37
342/357.63
8,855,044 B2 * 10/2014 Liao ................... H04W 56/0045
370/324

(Continued)

FOREIGN PATENT DOCUMENTS

EP 3808034 A2 11/1997
EP 1091506 A2 4/2001

(Continued)

OTHER PUBLICATIONS

3GPP TS 36.213 V14.3.0, Jun. 2017.
Arroyo Valles, "Office Action for EP Application No. 18756246.7",. dated Oct. 25, 2021, EPO, Netherlands.

*Primary Examiner* — Harry H Kim
(74) *Attorney, Agent, or Firm* — Novick, Kim & Lee, PLLC; Jae Youn Kim; Jihun Kim

(57) ABSTRACT

A wireless communication system has at least one user-side-device and a base-station. The at least one user-side-device and the base-station are configured to communicate with each other via a satellite applying a timing-advance-value (TA) for synchronizing an uplink of the communication. The base-station is configured to provide the at least one user-side-device with a satellite-connecting-signal concerning an uplink towards the satellite, the satellite-connecting-signal providing configuration information in order to establish and adjust the uplink to the satellite. The at least one user-side-device is configured to perform an adjustment of the timing-advance-value for a pre-compensation of at least one synchronization offset of an uplink in case the at least one (Continued)

user-side-device receives the satellite-connecting-signal, the satellite-connecting-signal including a granting-signal indicating the user-side-device the allowance to adjust the timing-advance-value. Responsive to the granting-signal, the at least one user-side-device is configured to automatically adjust the timing-advance-value for an unlimited time or for a certain period of time, until the at least one user-side-device receives a new TA adjustment configuration.

30 Claims, 9 Drawing Sheets

(56) References Cited

U.S. PATENT DOCUMENTS

| | | | |
|---|---|---|---|
| 10,506,483 B1* | 12/2019 | Williamson | H04B 7/18584 |
| 2004/0192201 A1 | 9/2004 | Febvre et al. | |
| 2014/0050213 A1* | 2/2014 | Nguyen | H04W 56/0045 370/350 |
| 2014/0098798 A1* | 4/2014 | Khandekar | H04W 56/0005 370/336 |
| 2015/0146687 A1* | 5/2015 | Kim | H04W 36/03 370/331 |
| 2016/0278033 A1* | 9/2016 | Wu | H04W 56/0045 |
| 2016/0295532 A1* | 10/2016 | Cao | H04W 56/001 |
| 2018/0102807 A1* | 4/2018 | Chen | H04L 25/03006 |
| 2018/0242140 A1* | 8/2018 | Meredith | H04W 4/14 |
| 2018/0310217 A1* | 10/2018 | Ohta | H04W 36/30 |
| 2019/0269939 A1* | 9/2019 | Ooga | A61N 5/107 |
| 2019/0280743 A1* | 9/2019 | Bengtsson | H04W 72/1257 |

FOREIGN PATENT DOCUMENTS

| | | |
|---|---|---|
| EP | 1429575 A1 | 6/2004 |
| EP | 3030018 A1 | 6/2016 |
| WO | 2004002022 A1 | 12/2003 |
| WO | 2014/117372 A1 | 8/2014 |
| WO | 2017023576 A1 | 2/2017 |

* cited by examiner

WIRELESS COMMUNICATION SYSTEM, BASE-STATION AND USER-SIDE-DEVICE

CROSS-REFERENCES TO RELATED APPLICATIONS

This application is a continuation of copending International Application No. PCT/EP2018/072577, filed Aug. 21, 2018, which is incorporated herein by reference in its entirety, and additionally claims priority from European Application No. EP 17187318.5, filed Aug. 22, 2017, which is incorporated herein by reference in its entirety.

The invention refers to a wireless communication system. Further, the invention refers to a base-station and to a user-side-device. The invention also refers to a method for handling wireless communication between a user-side-device and a base-station via a satellite.

BACKGROUND OF THE INVENTION

The delay over satellite links (earth hub station containing a base-station—satellite—user-equipment) has a strongly variable delay in case of non-geostationary satellites. The user-equipment (also named mobile terminal or user terminal) may be on ground (continental or on ships) or located on aerial platforms (UAV, HAPS, drones, planes). In the following, user-side-device will refer to a device located at the side of the user and having respective functionalities relevant for the communication with the base-station. Hence, there is a user-side and a base-station-side which communicate with each other via a satellite. For the communication, a base-station and at least one user-side-device are present.

A requirement of the waveforms for LTE (long-term evolution) and New Radio is, that all mobile terminals—or user-equipments—have to transmit on the return link such that all signals arrive synchronously at the earth hub station/base-station. In case of LTE, it is a requirement that all signals from the mobile terminals arrive with a maximum variation within the cyclic prefix time (4.7 µs normal cyclic prefix, 16.7 µs extended cyclic prefix). In order to meet this time slot exactly, each mobile terminal has to start transmission a bit earlier (called timing advance) to compensate for the individual propagation delay. So, the individual timing advance values of the mobile terminals have to be adjusted dynamically over time, according to variable distance between base-station and user-equipment, e.g. due to movement by cars, planes, pedestrians etc.

In case of terrestrial communication, the distance (and thus the delay over the transmission link) is determined by the rather low mobility of the user-equipment only (compared to satellite speeds), since all base-stations are normally static.

A first problem occurs, when satellite links are included in the transmission chain. In this case, the strong delay variation caused by the moving satellite (e.g. in GEO, LEO, MEO orbits) is generating a fast change in the overall distance of the propagation from user-equipment over satellite to base-station.

A current mechanism in LTE for evaluating the propagation time is the following:
  The user-equipment transmits PUSCH (Physical Uplink Shared Channel) signal during initial access.
  The base station measures the time of arrival of the PUSCH signal and determines the individual necessary timing adjustment value (which is called in the context of LTE: Timing advance or TA value, TA) for the user-equipment.
  The individual necessary timing adjustment value is sent from the base-station to the user-equipment.
  The user-equipment uses the individual necessary timing adjustment value to adjust timing for all upcoming next uplink transmissions.
  As a consequence, all user-equipments will send in such a way that all their signals within a cell arrive synchronously at the base-station.

In LTE the maximum range of distance between user-equipment and base-station depends on PRACH format and ranges between 14 km and 103 km.

The granularity of the timing adjustment in LTE is given by the following relationship:
  The Uplink Transmission Time equals the (uplink transmission time for previous subframe) plus (TA value—31) times 16 samples, where 1 sample is about 0.033 µs and 16 samples is about 0.52 µs.

In case of non-geostationary satellites, the delay variation might be 40 µs/s. This equals the difference of the TA value 80/sec or 1 TA value per 12.5 ms. This is about one LTE radio frame (see FIG. 1 in the following).

So using existing methods from LTE to adjust continuously the TA is not sufficient and would cause significant signaling overhead in the network only for the purpose of timing adjustments. Further, in the case of satellite communication, the cell size is significantly higher (200 km up to more than 1000 km) than in terrestrial networks (up to 10 or 20 km max.) and the number of user-equipment is expected to be higher than in terrestrial cells.

Further details can be found in 3GPP TS 36.213 V14.3.0, June 2017.

A second problem is that the delay variation over the satellite link is much more than a Transmission Time Interval (TTI; in LTE: 1 ms) and to be expected to be even less for New Radio, where higher numerologies are considered. E.g. the subcarriers pacing (SCS) is increasing from 15 kHz (numerology 1) to 60 kHz (numerology 4), and the TTI down from 1 ms to 250 µs. So the transmission timing of the user-equipment has to be adjusted over the borders of individual TTIs.

Adjust the timing of a user-equipment over different TTIs is not state-of-the-art (SOTA), e.g. in LTE, the timing adjustment is done within a single TTI only, because the total maximum propagation delay is well within a TTI (100 km maximum cell size is equal to a single way delay of 0.33 ms).

A third problem is the handover from one satellite to another satellite. If both satellites involved in a handover process are transparent (non-processing, but only doing frequency conversion), the user-equipments on ground are still connected to the same base-station on ground in the hub station. During the handover process, the user-equipments experience a significantly different absolute delay over the satellite link, and the jump can be in the range of several ms, which is significantly higher than the TTI time length.

SUMMARY

According to an embodiment, a wireless communication system may have: at least one user-side-device and a base-station, wherein the at least one user-side-device and the base-station are configured to communicate with each other via a satellite applying a timing-advance-value (TA) for synchronizing an uplink of the communication, wherein the base-station is configured to provide the at least one user-side-device with a satellite-connecting-signal concerning an uplink towards the satellite, the satellite-connecting-signal providing configuration information in order to establish and adjust the uplink to the satellite, and wherein the at least one user-side-device is configured to perform an adjustment of the timing-advance-value for a pre-compensation of at least one synchronization offset of an uplink in case the at least one user-side-device receives the satellite-connecting-signal, the satellite-connecting-signal including a granting-signal indicating the userside-device the allowance to adjust the timing-advance-value, wherein, responsive to the granting-signal, the at least one user-side-device is configured to automatically adjust the timing-advance-value on its own for an unlimited time or for a certain period of time, until the at least one user-side-device receives a new TA adjustment configuration.

According to another embodiment, a wireless communication system may have: at least one user-side-device and a base-station, wherein the at least one user-side-device and the base-station are configured to communicate with each other via a satellite applying a timing-advance-value for synchronizing an uplink of the communication, wherein the base-station is configured to provide the at least one user-side-device with a satellite-connecting-signal concerning an uplink towards the satellite, the satellite-connecting-signal providing configuration information in order to establish and adjust the uplink to the satellite, wherein the at least one user-side-device is configured to adjust the timing-advance-value for a pre-compensation of at least one synchronization offset of an uplink in case the at least one user-side-device receives the satellite-connecting-signal, the satellite-connecting-signal including a granting-signal indicating the user-side-device the allowance to adjust the timing-advance-value, wherein the wireless communication system includes at least one intermediary-device and a plurality of user-equipments, wherein the at least one user-side-device adjusting the timing-advance-value is the intermediary-device, wherein the user-equipments are configured to send signals directly to the satellite or via the intermediary-device, wherein the intermediary-device is configured to serve as an alignment-entity, and wherein the intermediary-device is configured to align the signals by processing the signals based on the timing-advance-value and/or by aligning frequency offsets between the signals.

According to another embodiment, a wireless communication system may have: at least one user-side-device and a base-station, wherein the at least one user-side-device and the base-station are configured to communicate with each other via a satellite applying a timing-advance-value for synchronizing an uplink of the communication, wherein the base-station is configured to provide the at least one user-side-device with a satellite-connecting-signal concerning an uplink towards the satellite, the satellite-connecting-signal providing configuration information in order to establish and adjust the uplink to the satellite, and wherein the at least one user-side-device is configured to adjust the timing-advance-value for a pre-compensation of at least one synchronization offset of an uplink in case the at least one user-side-device receives the satellite-connecting-signal, the satellite-connecting-signal including a granting-signal indicating the userside-device the allowance to adjust the timing-advance-value, wherein the wireless communication system includes at least one intermediary-device and a plurality of user-equipments, wherein the at least one user-side-device adjusting the timing-advance-value is the intermediary-device, wherein the user-equipments are connected with the intermediary-device, wherein the intermediary-device is configured to serve as an alignment-entity, and wherein the intermediary-device is configured to provide the connected user-equipments with timing-advance-values.

According to yet another embodiment, a wireless communication system may have: at least one user-side-device and a base-station, wherein the at least one user-side-device and the base-station are configured to communicate with each other via a satellite applying a timing-advance-value for synchronizing an uplink of the communication, wherein the base-station is configured to provide the at least one user-side-device with a satellite-connecting-signal concerning an uplink towards the satellite, the satellite-connecting-signal providing configuration information in order to establish and adjust the uplink to the satellite, wherein the at least one user-side-device is configured to adjust the timing-advance-value for a pre-compensation of at least one synchronization offset of an uplink in case the at least one user-side-device receives the satellite-connecting-signal, the satellite-connecting-signal including a granting-signal indicating the user-side-device the allowance to adjust the timing-advance-value, wherein the wireless communication system includes at least one user-equipment and an intermediary-device being a user-equipment, wherein the at least one user-side-device predicting and/or adjusting the timing-advance-value is the intermediary-device, wherein the intermediary-device is configured to serve as a relay, wherein the at least one user-equipment is configured to communicate with the base-station via the intermediary-device, and wherein the intermediary-device is configured to predict and/or adjust the timing-advance-value based on a change or relative movement between the intermediary-device and the at least one user-equipment affecting the timing-advance-value.

According to yet another embodiment, a wireless communication system may have: at least one user-side-device and a base-station, wherein the at least one user-side-device and the base-station are configured to communicate with each other via a satellite, wherein the base-station is configured to provide the at least one user-side-device with a satellite-connecting-signal concerning an uplink towards the satellite, the satellite-connecting-signal providing configuration information in order to establish and adjust the uplink to the satellite, wherein the base-station is configured to provide at least one user-side-device with handover-information included in the satellite-connecting-signal concerning a handover from a current satellite to a different satellite, wherein at least one user-side-device is configured to adjust uplink-settings based on the handover-information in case of receiving the handover-information, wherein the wireless communication system includes at least one intermediary-device and a plurality of user-equipments, wherein the at least one user-side-device adjusting the uplink-settings is the intermediary-device, wherein the user-equipments are configured to send signals to the base-station via the intermediary-device, wherein the intermediary-device is configured to serve as an alignment-entity, and wherein the intermediary-device is configured to align the signals with respect to time and/or frequency and/or code and/or other resources by processing the signals based on the handover-information.

According to still another embodiment, a wireless communication system may have: at least one user-side-device and a base-station, wherein the at least one user-side-device and the base-station are configured to communicate with each other via a satellite, wherein the base-station is configured to provide the at least one user-side-device with a satellite-connecting-signal concerning an uplink towards the satellite, the satellite-connecting-signal providing configuration information in order to establish and adjust the uplink to the satellite, wherein the base-station is configured to provide at least one user-side-device with handover-information included in the satellite-connecting-signal concerning a handover from a current satellite to a different satellite, wherein at least one user-side-device is configured to adjust uplink-settings based on the handover-information in case of receiving the handover-information, wherein the wireless communication system includes at least one intermediary-device and a plurality of user-equipments, wherein the at least one user-side-device adjusting the uplink-settings is the intermediary-device, wherein the user-equipments are connected with the intermediary-device, wherein the intermediary-device is configured to serve as an alignment-entity, and wherein the intermediary-device is configured to provide the connected user-equipments with handover-information.

According to still another embodiment, a wireless communication system may have: at least one user-side-device and a base-station, wherein the at least one user-side-device and the base-station are configured to communicate with each other via a satellite, wherein the base-station is configured to provide the at least one user-side-device with a satellite-connecting-signal concerning an uplink towards the satellite, the satellite-connecting-signal providing configuration information in order to establish and adjust the uplink to the satellite, wherein the base-station is configured to provide at least one user-side-device with handover-information included in the satellite-connecting-signal concerning a handover from a current satellite to a different satellite, wherein at least one user-side-device is configured to adjust uplink-settings based on the handover-information in case of receiving the handover-information, wherein the wireless communication system includes at least one user-equipment and an intermediary-device, wherein the at least one user-equipment is configured to communicate with the base-station via the intermediary-device, and wherein the intermediary-device is configured to act as a buffer during the handover by storing at least one transmission time interval of uplink data of the at least one user-equipment.

Another embodiment may have a user-side-device, wherein the user-side-device is configured to communicate with a base-station via a satellite applying a timing-advance-value for synchronizing an uplink of the communication, the user-side-device is configured to receive a satellite-connecting-signal concerning an uplink towards the satellite provided by the base-station, the satellite-connecting-signal providing configuration information in order to establish and adjust the uplink to the satellite, the user-side-device is configured to perform an adjustment of the timing-advance-value for a pre-compensation of at least one synchronization offset of an uplink in case the satellite-connecting-signal is received, the satellite-connecting-signal including a granting-signal indicating the user-side-device the allowance to adjust the timing-advance-value, and responsive to the granting-signal, the user-side-device is configured to automatically adjust the timing-advance-value on its own for an unlimited time or for a certain period of time, until the at least one user-side-device receives a new TA adjustment configuration.

Another embodiment may have a base-station, wherein the base-station is configured to communicate with at least one user-side-device via a satellite applying a timing-advance-value for synchronizing an uplink of the communication, the base-station is configured to provide the at least one user-side-device with a satellite-connecting-signal concerning an uplink towards the satellite, the satellite-connecting-signal providing configuration information in order to establish and adjust the uplink to the satellite, and the satellite-connecting-signal including a granting-signal indicating the user-side-device the allowance to adjust the timing-advance-value automatically on its own for an unlimited time or for a certain period of time, until the at least one userside-device receives a new TA adjustment configuration.

According to another embodiment, a method for handling wireless communication between at least one user-side-device and a base-station via a satellite may have the steps of: providing the at least one user-side-device with a satellite-connecting-signal concerning an uplink towards the satellite, the satellite-connecting-signal providing configuration information in order to establish and adjust the uplink to the satellite, and performing an adjustment of the timing-advance-value for a pre-compensation of at least one synchronization offset of an uplink from the at least one user-side-device via the satellite to the base-station in case the at least one user-side-device receives the satellite-connecting-signal, the satellite-connecting-signal including a granting-signal indicating the user-side-device the allowance to adjust the timing-advance-value, and wherein, responsive to the granting-signal, the user-side-device automatically adjusts the timing-advance-value on its own for an unlimited time or for a certain period of time, until the at least one userside-device receives a new TA adjustment configuration.

The invention refers to a wireless communication system.

The wireless communication system comprises at least one user-side-device and a base-station. The at least one user-side-device and the base-station are configured to communicate with each other via a satellite. The base-station is configured to provide the at least one user-side-device with a satellite-connecting-signal concerning an uplink towards the satellite. The at least one user-side-device is configured to perform at least one prediction and/or adjustment with regard to a behavior and/or a rule over time and/or a frequency for a pre-compensation of at least one synchronization offset of an uplink in case the at least one user-side-device receives the satellite-connecting-signal.

Within the wireless communication system at least one user-side-device and a base-station communicate with each other using a satellite. The base-station sends a satellite-connecting-signal to the at least one user-side-device which after receiving the satellite-connecting-signal performs at least one prediction and/or adjustment with regard to an uplink from the at least one user-side-device to the satellite. The adjustment refers in an embodiment to the prediction and/or adjustment of the timing-advance-value and refers in an additional or alternative embodiment to the prediction and/or adjustment of uplink-settings, especially in connection with a handover from one satellite to a different satellite. Such uplink-settings can include also the expected carrier frequency as well as frequency offsets to be pre-compensated by the user-side-device.

Hence, based on the satellite-connecting-signal provided by a base-station, a user-side-device performs an prediction and/or adjustment with regard to a behavior and/or a rule over time and/or a frequency for a pre-compensation of at least one synchronization offset of an uplink connection towards a satellite.

The satellite-connecting-signal is a signal providing configuration information in order to establish and adjust the uplink to the satellite. This signal is likely to be provide along with other signals and data via a satellite or on a separate configuration link but other trans-mission ways are possible as well. The satellite-connecting-signal can also provide re-source allocation (RA) information and TA information for the uplink such that the combination of RA info and TA info represents the total TA values. For example, the RA info is used to provide integer TA value part of several TTIs and the TA info is used to provide the fractional TA value part as a ratio of a TTI.

According to an embodiment, the satellite-connecting-signal is just a trigger signal allowing the user-side-device to adjust and/or predict the TA value on its own. In an alternative or additional embodiment, the satellite-connecting-signal carries information to be used by the user-side-device.

A user-side-device is a general communication device, which is capable in the different embodiments to handle the TA prediction and/or adjustment and/or a coordination approach regarding a handover between satellites.

A user-equipment is often referred to as a handheld or mobile transceiver device or a user-terminal, because upper network layer are supported for the end-user-specific application layer. It usually owns the physical layer Rx and Tx modules, resource allocation functional blocks to coordinate with BS, TA functional blocks, (H)ARQ functional blocks etc. In some embodiments, the user-side-device is realized by a user-equipment implying that the user-equipment enables the TA prediction and/or adjustment and/or the realization of the coordination approaches.

In some of the following embodiments, an intermediary-device is described which may be a relay that is forwarding data to and/or from user-equipments (bi-directional or only uni-directional).

In some embodiments, the intermediary-device is configured concerning the TA prediction and/or adjustment and/or the coordination approaches.

An alignment entity (AE) can—depending on the embodiment—just calculate and provide the TA information for the user-equipments connected with it. Resource allocation and other protocols for link coordination/configuration of the user-equipments with the base-station can be just forwarded in both directions (transparent to the BS) or processed and forwarded (either nontransparent or semi-transparent to the base-station).

In an embodiment, a data-relaying is performed. In this case that intermediary-device can be termed relay, which means that user data is forwarded to and/or from the connected user-equipments (bi-directional or only uni-directional).

In a different embodiment, no data-relaying happens. Only the data for uplink adjustment and configuration is provided to the connected user-equipments. The user-equipments transmit their uplink signal directly to satellite.

In some embodiments, a user-equipment serves as the user-side-device with the features concerning the TA prediction and/or adjustment and/or the coordination approaches. This means that a relay-user-equipment is given, which looks to the base-station as a user-equipment but serves other user-equipments as well. An alignment entity (AE) in this user-side-device calculates and provides the TA information (and potentially also the local resource allocation signaling) for the connected user-equipments. In an embodiment, an alignment entity also cares for the local resource allocation (semi- or non-transparent to the BS).

In an embodiment, data-relaying happens with amplification and forwarding. This embodiment may have a low complexity. In this embodiment, user data is forwarded to and/or from connected user-equipments (bi-directional or only uni-directional). The alignment-entity takes care that the user-equipments transmit correctly synchronized to the resources granted to relay-user-equipment so that amplify and forward is sufficient.

In a different embodiment data-relaying is performed with processing and forwarding. This may be a more complex embodiment. In this embodiment, user data is forwarded to and/or from connected user-equipments (bi-directional or only uni-directional). The relay-user-equipment processes the user data, e.g. decode and re-encode in one or both directions. The alignment-entity takes care that the user-equipments transmit synchronized so that it can be forwarded to the resources granted to relay-user-equipment and minimizing the data buffered at the relay-user-equipment. This embodiment is, for example, suitable in case different waveforms are used for satellite and terrestrial communication.

The term relay-user-equipment refers to data relaying in addition to providing the uplink configuration information. In a different embodiment, an user-side-device with alignment entity is given that provides the uplink configuration information only but does not relay the data of the connected user-equipments. Both mentioned types are intermediary-devices.

According to an embodiment, the at least one user-side-device and the base-station are configured to communicate with each other via the satellite applying a timing-advance-value for synchronizing an uplink of the user-equipment towards the satellite of the communication. The base-station is configured to provide the at least one user-side-device with a granting-signal comprised by the satellite-connecting-signal. The at least one user-side-device is configured to predict and/or adjust the timing-advance-value as specified or indicated within the satellite-connecting-signal in case the at least one user-side-device receives the granting-signal. In this embodiment, the at least one user-side-device receives a granting-signal and starts to predict and/or adjust the timing-advance-value that is used for synchronizing the communication with the base-station. Hence, at least the uplink undergoes an prediction and/or adjustment in this embodiment with respect to the timing-advance-value.

In an embodiment, the at least one user-side-device is configured to predict and/or adjust the timing-advance-value (TA) for a shared uplink among a plurality of user-equipments.

In a further embodiment, the at least one user-side-device is configured to predict and/or adjust the timing-advance-value for a given time and/or for an unlimited time and/or until the at least one user-side-device receives a timing-advance-update-request and/or a new TA adjustment configuration as specified or indicated within the another satellite-connecting-signal from the base-station.

According to an embodiment, the at least one user-side-device comprises a data-storage. The at least one user-side-device is configured to predict and/or adjust the timing-advance-value based on previous timing-advance-values and/or characteristics affecting the timing-advance-value (TA) stored in the data-storage. Here, the at least one user-side-device extrapolates from foregoing timing-advance-values and/or characteristics affecting the timing-advance-value (TA) to following values.

In a further embodiment, the at least one user-side-device comprises a data-storage. The at least one user-side-device is configured to predict and/or adjust the timing-advance-value based on a drift-value and/or a drift-characteristic and/or a vector of timing-advance-values stored in the data-storage. The base-station is configured to provide the at least one user-side-device with an index indicating which stored drift-value and/or drift-characteristic and/or which timing-advance-value of the vector of timing-advance-values is to be used by the at least one user-side-device. Here, different drift values are stored and a fitting drift value is used for the current situation.

According to an embodiment, the at least one user-side-device comprises a data-storage. The base-station is configured to provide the at least one user-side-device with data to be stored within the data-storage concerning at least one timing-advance-value (TA) and/or a dataset concerning timing-advance-values (TA) and/or a characteristic affecting timing-advance-values (TA) and/or a drift-value and/or a drift-characteristic. In this embodiment, the base-station provides the user-side-device with data concerning an adjustment and/or prediction. Data-storage can e.g. be fed by local TA estimates and/or calculation results and/or via satellite connecting signal. This feeding and updating is used in an embodiment in case the data will be dependent on the location of the user-side-device on earth with respect to the satellite constellation.

In an embodiment, the base-station is configured to provide the at least one user-side-device with the data to be stored within the data-storage during an initial access of the user-side-device to the wireless communication system based on a location of the user-side-device.

According to an embodiment, the at least one user-side-device is configured to predict and/or adjust the timing-advance-value based on a drift-value and/or drift-characteristic. This drift-value and/or drift-characteristic is, for example, provided by the base-station within the satellite-connecting-signal.

In a further embodiment, the at least one user-side-device is configured to predict and/or adjust the timing-advance-value based on data provided by at least one different user-side-device. The at least one user-side-device that received the granting-signal in this embodiment also receives data from other user-side-devices advantageously located in its vicinity for performing the prediction and/or adjustment. In an embodiment, the surrounding user-side-devices provide their respective timing-advance-values.

According to an embodiment, the at least one user-side-device is configured to use a—in an embodiment a modulated signal, either with orthogonal or non-orthogonal multiple access scheme—for the uplink and to predict and/or adjust the timing-advance-value for the uplink and to use at least one further communication link in a simultaneous or alternating way with a satellite-link signal.

In an embodiment, the at least one user-side-device is configured to use any orthogonal or non-orthogonal multiple access scheme like time-division multiple access (TDMA), frequency division multiple access scheme (FDMA) or code division multiple access (CDMA) or a non-orthogonal access (e.g. NOMA). Orthogonal Frequency Division multiplexing Access (OFDMA) is a legacy multiple access scheme where the time-frequency resource allocation are orthogonal to each other. In Non-orthogonal Multiple access (NOMA) schemes, the non-orthogonality is either in power domain or in code domain. In power domain NOMA, two user signals could be multiplexed together on the same time-frequency resource, and for the receiver at the cell-edge, a successive interference cancellation (SIC) can be done to remove the interfering signal from the signal of interest. SIC is not needed for the UE at the cell centre. Code division multiple access (CDMA) which is a type of code domain multiple access has existed for years. Optimum use of time-frequency and power resources can be done with variations of NOMA schemes like SCMA (Sparse Code Multiple Access) or Interleaved Division Multiple access (IDMA), or some other variations of it.

Alternatively, the at least one user-side-device is configured to perform Carrier Aggregation by using a group of component carrier signals (i.e. multiple signals) for the uplink and to predict and/or adjust the timing-advance-value jointly for each component carrier signal of the group of carrier signals for the uplink. In an embodiment, the at least one user-side-device is configured to use at least one further communication link in a simultaneous or alternating way with a satellite-link signal.

Hence, depending on the embodiment, either one signal is used or various signals are used as a carrier for the uplink towards the satellite.

In a further embodiment, the at least one user-side-device predicting and/or adjusting the timing-advance-value is a user-equipment. A user-equipment is a device that can be used directly by an end-user for communication purposes.

In some embodiments, an intermediary-device is used as a kind of central unit for handling or channeling the communication of different user-equipments. In an embodiment, a plurality of user-equipments is connected with the intermediary-device and they submit their respective signals to the intermediary-device that passes the signals—in an embodiment following a processing of them—to the satellite. In an embodiment, the intermediary-device performs the adjustment of relevant parameters, e.g. the timing-advance-value and/or the rules for an re-access following a handover, and provides the connected user-equipments with the adjusted values. Accordingly, in an embodiment the intermediary-device receives the satellite-connecting-signal from the base-station.

According to an embodiment, the wireless communication system comprises an intermediary-device and a plurality of user-equipments. The at least one user-side-device predicting and/or adjusting the timing-advance-value is the intermediary-device. The intermediary-device is configured to serve as an alignment-entity. The user-equipments are configured to send signals directly to the satellite or via the intermediary-device. In the latter embodiment, the user-equipments send their signals to the intermediary-device that sends them to the satellite. In the former embodiment, the intermediary-device is not used by the user-equipments for the transfer of the signals towards the satellite. The intermediary-device is configured to process the signals based on the timing-advance-value. The intermediary-device is configured to align the signals by the processing. In an embodiment, the intermediary-device is aligning frequency offsets between the signals.

In an embodiment, the wireless communication system comprises at least one intermediary-device and a plurality of user-equipments. The at least one user-side-device predicting and/or adjusting the timing-advance-value is the intermediary-device. The user-equipments are connected with the intermediary-device. The intermediary-device is configured to serve as an alignment-entity. The intermediary-device is configured to provide the connected user-equipments with timing-advance-values. These are advantageously user-equipment-individual timing-advance-values.

In a further embodiment, the intermediary-device and the user-equipment are combined. The combination implies that either an intermediary-device has functionalities of an user-equipment or a user-equipment also serves as an intermediary-device. Alternatively or additionally, the intermediary-device is at the satellite with software-defined processing payloads, Alternatively or additionally, the intermediary-device is comprised by a user-equipment. Alternatively or additionally, the intermediary-device is a separate unit, especially separated from a user-equipment. Alternatively or additionally, the intermediary-device is comprised by the satellite, where no software-defined reconfiguration is available.

In an embodiment, the wireless communication system comprises at least two intermediary-devices. Each of the at least two intermediary-devices is configured to serve as an alignment-entity. The at least two intermediary-devices are configured to communicate with each other. In this embodiment, a sidelink between two intermediary-devices is used. This embodiment is suitable in case of severe channel conditions so that e.g. one intermediary-device cannot properly receive the satellite-connecting-signal, but other intermediary-devices can help via the sidelink.

According to an embodiment, the wireless communication system comprises at least one user-equipment and an intermediary-device being a user-equipment. The at least one user-side-device predicting and/or adjusting the timing-advance-value is the intermediary-device. The intermediary-device is configured to serve as a relay. The at least one user-equipment is configured to communicate with the base-station via the intermediary-device. The intermediary-device is configured to adjust and/or predict the timing-advance-value based on a change or relative movement between the intermediary-device and the at least one user-equipment affecting the timing-advance-value. Thus, in this embodiment various user-equipments are present and one of them serves as the intermediary-device.

In an embodiment, the at least one user-side-device is configured to predict a movement of the satellite and/or a movement of a different satellite and/or a movement of the at least one userside-device and/or a movement of at least one user-equipment for predicting the timing-advance-value (TA) and/or various timing-advance-values (TA) and/or a drift characteristic of a timing-advance-value (TA) and/or drift characteristics of various timing-advance-values (TA).

Some of the following embodiments refer to the situation of a handover from one satellite to a different satellite. Here, the adjustment refers to uplink-settings concerning e.g. the new uplink parameters and/or the time for starting an access to the new satellite.

In an embodiment, the base-station is configured to provide at least one user-side-device with handover-information comprised by the satellite-connecting-signal concerning a handover from a current satellite to a different satellite. At least one user-side-device is configured to adjust and/or predict uplink-settings based on the handover-information in case of receiving the handover-information. Here, handover-information is included by the satellite-connecting-signal provided by the base-station. At least one user-side-device in the wireless communication system is configured to use the handover-information for adjusting and/or predicting uplink-settings. Hence, preparations are done for an expected handover.

According to an embodiment, the handover-information comprises an announcement of a handover to be expected. Additionally or alternatively, the handover-information comprises data for the handover based on information concerning the current satellite and/or the different satellite. Additionally or alternatively, the handover-information comprises information about a type of initial access/re-access following the handover. Additionally or alternatively, the handover-information comprises information concerning a prioritization of different user-equipments and/or groups of user-equipments and/or services and/or network slices and/or types of communication concerning an initial access/re-access following the handover. The type of communication means the medium access schemes, and/or the waveforms and/or the waveform releases. The priority refers to the sequence in which the user-equipments etc. access and/or re-access. Additionally or alternatively, the handover-information comprises information about allowing collision avoidance of an initial access-procedure and/or a re-access-procedure following the handover. Alternatively or additionally, the handover-information comprises information about prioritization of an initial access-procedure and/or a re-access-procedure following the handover. The collision avoidance or prioritization refers in an embodiment to a start time and/or a time offset and/or a time interval or any other parameter to coordinate/prioritize access in frequency/time/code domain. This means in more general that time and/or frequency and/or code and/or other resources are coordinated to avoid collision.

In a further embodiment, the wireless communication system comprises at least one intermediary-device and a plurality of user-equipments. The at least one user-side-device predicting and/or adjusting the uplink-settings is the intermediary-device. The user-equipments are configured to send signals to the base-station via the intermediary-device. The intermediary-device is configured to serve as an alignment-entity. The intermediary-device is configured to align the signals with respect to time and/or frequency and/or code and/or other resources by processing the signals based on the handover-information.

According to an embodiment, the wireless communication system comprises at least one intermediary-device and a plurality of user-equipments. The at least one user-side-device predicting and/or adjusting the uplink-settings is the intermediary-device. The user-equipments are connected with the intermediary-device. The intermediary-device is configured to serve as an alignment-entity. The intermediary-device is configured to provide the connected user-equipments with handover-information.

According to an embodiment, the wireless communication system comprises at least one user-equipment and an intermediary-device. The at least one user-equipment is configured to communicate with the base-station via the intermediary-device. The intermediary-device is configured to act as a buffer during the handover by storing at least one transmission time interval of uplink data of the at least one user-equipment.

The foregoing embodiments refer to a wireless communication system comprising a base-station and at least one user-side-device. The invention also refers to a user-side-device that might be used in any embodiment of the foregoing system but also in a different communication system.

The user-side-device is configured to communicate with a base-station via a satellite. The userside-device is configured to receive a satellite-connecting-signal concerning an uplink towards the satellite provided by the base-station. The user-side-device is configured to perform at least one prediction and/or adjustment with regard to a behavior and/or a rule over time and/or a frequency for a precompensation of at least one synchronization offset of an uplink in case the userside-device receives the satellite-connecting-signal.

Embodiments of the user-side-device are given by the different discussed embodiments of the wireless communication system in the foregoing and in the following.

Hence, according to an embodiment, the user-side-device is a user-equipment. In an alternative or additional embodiment, the user-side-device is an intermediary-device serving e.g. as a relay or an alignment-entity.

The invention also refers to a base-station that might be used in the wireless communication system discussed above or in a different communication system.

The base-station is configured to communicate with at least one user-side-device via a satellite. The base-station is configured to provide the at least one user-side-device with a satellite-connecting-signal concerning an uplink towards the satellite.

The base-stations according to the different embodiments of the wireless communication system are also different possible embodiments of the base-station.

The object is also achieved by a method for handling wireless communication between a at least one user-side-device and a base-station via a satellite.

The method comprises at least the following steps:
providing the at least one user-side-device with a satellite-connecting-signal concerning an uplink towards the satellite, and
performing at least one prediction and/or adjustment with regard to a behavior and/or a rule over time and/or a frequency for a precompensation of at least one synchronization offset of an uplink from the at least one user-side-device via the satellite to the base-station in case the at least one user-side-device receives the satellite-connecting-signal.

The embodiments of the system can also be realized by the method, and vice versa.

Some embodiments will be explained again using a different wording.

In an embodiment, the New Radio access technology is used for satellite communication as well. Here, SC-FDMA (single-carrier frequency-division multiple access) is one of the defined waveforms as defined in 3GPP (3rd Generation Partnership Project) for the user-equipment uplink to the base-station, with all problems as described before when applying to satellite communication. Any other waveform is not excluded and can also be used.

Some embodiments refer to a connectivity to a single satellite.

At least one embodiment allows a predictive timing adjustments as a kind of adjustment of the TA value.

In an embodiment, the base-station signals to a user-equipment a grant that it is allowed to perform adjustments automatically for unlimited time or a certain period of time, until a new timing advance update request is coming from base-station. The user-equipment as a consequence adjusts automatically in an embodiment its TA value based on the latest history of TA values signaled by the network, i.e. by the base-station. For example, the user-equipment recognizes a drift of +10 µs/sec over the last minute that may be used and continues to apply this drift for the next 20 sec.

According to an embodiment, the base-station signals to the user-equipment a grant to adjust automatically for unlimited time or a certain period of time for a specific drift value of the timing advance over time. The drift value is in one embodiment provided by the base-station. For example, the user-equipment updates the TA value with +10 µs/sec for a duration of 20 sec.

In an embodiment, the base-station signals to the user-equipment a grant to adjust automatically for unlimited time or a certain period of time and signals a specific index for a predefined table (known to both base-station and user-equipment) for a specific drift value of the timing-advance-value over time. For example, the base-station sends an index 5 for a table containing a drift rate of the TA with +10 µs/sec and an initial TA given either also by a table or provided by the base-station.

According to an embodiment, the timing-advance-value is adjusted for Carrier Aggregation in uplink transmissions as well. Each of the individual predictive timing adjustments are signaled in an embodiment for a single carrier signal (of up to 20 MHz in LTE) or a group of carriers (like the primary cell/carrier and the secondary cells/carriers). This is based on the fact that all carriers sent over the same satellite have the same total delay at a time.

In a further embodiment, an Alignment Entity Functionality (AE) within the link from all user-equipments to the base-station is receiving the user-equipment signals, individually applies signal processing to the user-equipment signals and applies the timing alignment—i.e. the application of the timing advance adjustment—such that all user-equipment signals arrive within the useful time interval at the decoder in the base-station.

The AE is located or is realized and/or a part of:
within the satellite coverage area as a user-side-device,
onboard on satellite as part of the satellite payload,
located as separate entity near the base-station,
located inside (part of) the base-station.

At least one embodiment refers to a handover between satellites.

For a handover between satellites (from satellite A to satellite B), there is an additional challenge, that all user-equipments within the satellites coverage area experience a strong signal jump (waveform frame structure timing like frame start change, Doppler shift and Doppler spread will change, etc.). Such a handover can potentially cause network congestion, when all user-equipments will try to perform the initial access/re-access at a time. After the handover, it is likely that most or all user-equipment have to synchronize again to the same base-station, but with different frame timing and frequency offset etc.

For such a handover, some embodiments try to optimize the handover:

According to an embodiment, the base-station as a part of a network announces an upcoming satellite handover to at least one or all user-equipments in the satellite coverage area.

In an embodiment, the network announces additional information concerning the handover to support the user-equipments. Possible handover information is the delay jump of the frame starts and the Doppler frequency offsets for faster resynchronization.

According to an embodiment, to avoid congestion during the initial access/re-access of all user-equipments after satellite handover, the network announces an information to specify the type of initial access/re-access over time after the handover. The information refers e.g. to a time interval, a distribution function or a randomized offset function defining how the user-equipments initiate their individual synchronization process (which is the initial access/re-access procedure). Such a function is used in this embodiment instead of all user-equipments starting the initial access procedure immediately.

In an embodiment, to support prioritization of user-equipments and/or services based on criteria such as Quality-of-Service or network slices, the priority and type of initial access/re-access as described in the foregoing embodiment is signaled to the user-equipments in one of the following different ways:
jointly for all user-equipments ("Broadcast type"),
for groups of user-equipments ("Multicast type"),
for individual user-equipments ("Unicast type").

According to an embodiment, the network—e.g. the base-station—signals to user-equipments, which kind of method for the selection of start time of the initial access procedure shall be used. In an embodiment, starting time is randomly distributed over complete interval.

In an embodiment, the Alignment Entity discussed in a foregoing embodiment supports the initial access after a satellite handover by performing at least one of the following steps:

receiving the announcement concerning the handover, the additional handover information and/or the information concerning the access/re-access.

measuring the changed connection parameters like Doppler frequency offset and frame timing due to the handover. Alternatively or additionally, all user-equipments send Initial access/re-access signaling to the Alignment Entity.

performing alignment on the initial access/re-access signals of the user-equipments.

sending all aligned initial access signals to the satellite to which the handover has happened.

In an embodiment, a user-equipment acts as a relay with additional local connections to other user-equipments.

According to an embodiment, a user-equipment has relay functionality and, thus, serves as a kind of "local base-station" (further called relay-user-equipment) for other user-equipment in the vicinity. In this case, the drifting delay of the link from base-station over satellite to relay-user-equipment complicates the relay functionality, because the frame timing between relay-user-equipment and other user-equipment is drifting. This is not the case in pure terrestrial communication scenarios with relays.

The user-equipment-relay, thus, is a user-equipment serving as a relay and serving as an intermediary-device.

In an embodiment, the user-equipment-relay shares the frequency band in time-division multiple access (TDMA), frequency division multiple access scheme (FDMA) or code division multiple access (CDMA) or a non-orthogonal access (e.g. NOMA) with other relay return uplinks and/or direct user-equipment return uplinks. Therefore, it is called here relay-user-equipment because of using user-equipment functionality.

In an embodiment, the relay-user-equipment is configured to perform a frequency conversion for the communication between satellite and terrestrial components.

According to an embodiment, the relay-user-equipment is configured to perform physical layer signal processing and TA alignment (amplify-and-forward for user data from the user-equipments). In this embodiment, the user-equipments connected to this relay-user-equipment transmit with the correct TA with respect to the complete link between user-equipment, relay-user-equipment and satellite.

According to an embodiment, the relay-user-equipment is configured to perform Process-and-forward. The relay-user-equipment decodes, buffers and re-encodes according to satellite—relay-user-equipment link. In this embodiment, the user-equipments transmit with the correct TA with respect to the link of user-equipment to relay-user-equipment.

In an embodiment depending on at least one of the two foregoing embodiments, the relay-user-equipment calculates and submits the TA values to the user-equipments. One possible optimization criterion for TA calculation is to keep the buffer-fill level low to avoid congestion of the relay-buffer.

According to an embodiment, the relay-user-equipment includes the functionality to coordinate the timing advances of the connected user-equipments and the needed timing-advance-values for the return uplink—either via the relay or directly—to the satellite.

According to further embodiments, the relay-user-equipment has logic and processing to do at least one of the following tasks:

Track the needed timing advances between satellite and relay-user-equipment. Since the relay-user-equipment acts as a user-equipment towards satellite, forward and return resource management (for bi-directional data forwarding) at the relay-user-equipment is given for connected user-equipments. Accordingly in an embodiment, the relay-user-equipment needs from the base-station enough forward and return resources to satisfy the traffic demands of the connected user-equipments.

Coordination of the connected user-equipments in terms of user-equipment-individual timing advance and resource allocation between relay-user-equipment and user-equipments. Due to large delays and/or TA values this has an impact on the resource allocation.

TA coordination of user-equipments by relay-user-equipment is used for at least one of both:
for direct user-equipment to satellite uplink,
for relayed uplink to satellite (user-equipment to relay to Satellite).

Some advantages of the different embodiments are:
The signaling overhead in the satellite cell is significantly reduced.
Strong interference by non-synchronized user-equipments is avoided, when the TA update over the satellite failed.
Instead of continuous signaling of an updated TA values every few TTI length, the TA update by the base-station to all user-equipments within the satellite cell can be done e.g. every 10 sec or even less.
The synchronization of the user-equipment to the satellite is simplified due to announced satellite handovers and its specific characteristics.
Network congestions of the initial access after satellite handovers are avoided.
The handover success rate improves and the overall handover process speeds up, e.g. due to collision avoidance, improving the overall quality-of-experience.
The relay functionality of some embodiments has the advantage that timing advance-coordination and timing advance-adaptation can be handled much more precisely and with less network signaling overhead by the relay than directly over satellite. This is because of the shorter roundtrip-time of the user-equipment-relay link compared to the user-equipment-satellite-gateway link. So the relay decouples the problems. Only one device (which is in one embodiment not battery-driven) compared to several individual user-equipments (likely to be battery-driven) cares about the major TA of the satellite-link and fine-adjusts the small timing-advance-values of the user-equipment-to-relay link.
The quality-of-service can be kept more stable and thus, improves due to e.g. less congestion, collision avoidance.

BRIEF DESCRIPTION OF THE DRAWINGS

Embodiments of the present invention will be detailed subsequently referring to the appended drawings, in which.

DETAILED DESCRIPTION OF THE INVENTION

FIG. 1 shows the effect on the delay due to a satellite link within a wireless communication system.

FIG. 1 a) gives the single hop delay in µs over time [s]. The orbit height of the satellite is 1000 km.

FIG. 1 b) shows the drift of overall delay with the differential time delay [µ/s] on the y-axis and the time [s] on the x-axis.

The satellite elevation is shown in FIG. 1 c): The elevation [°] is given by the y-axis and time [s] on the x-axis. The first graph (labelled α) refers to the connection between the base-station and the satellite and the second graph (labelled β) refers to the connection between the satellite and the user-equipment.

The individual distances between base-station and satellite (curve labeled α) and between satellite and user-equipment (curve labelled β) are shown in FIG. 1 d). The distances on the y-axis are given in km.

FIG. 1 illustrates a variable one way delay over the link from base-station (also called hub station) over a low earth orbit (LEO) satellite (at an orbit speed of about 7000 m/s) to a mobile terminal, i.e. to a user-equipment, with either pure user-equipment functionality or relay-to-network type of user-equipment. A high differential delay variation of up to (35-to 40) µs/s is experienced in this scenario, asking for a very fast update of the timing advance adjustment in the user-equipment. Such a very fast update of the timing advance may not be required in terrestrial links, because the distance of the mobile terminal to the base-station is only varying slowly due to the terminal mobility.

Figure 1A:
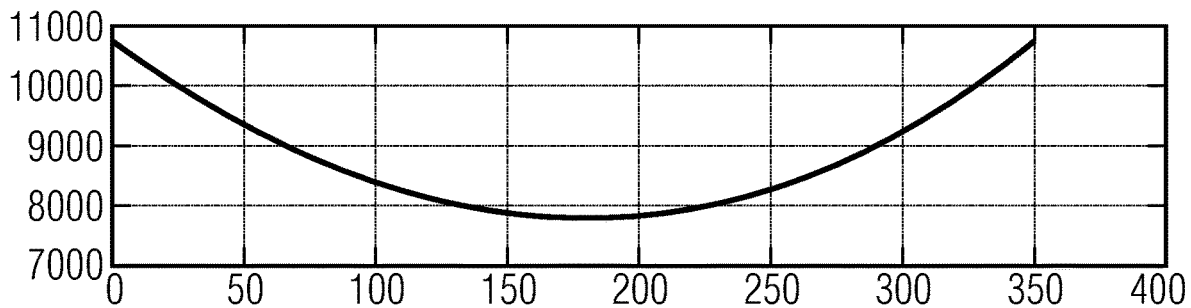
FIG. 1a to 1d show different variables within a wireless communication system using a satellite.
Figure 1B:
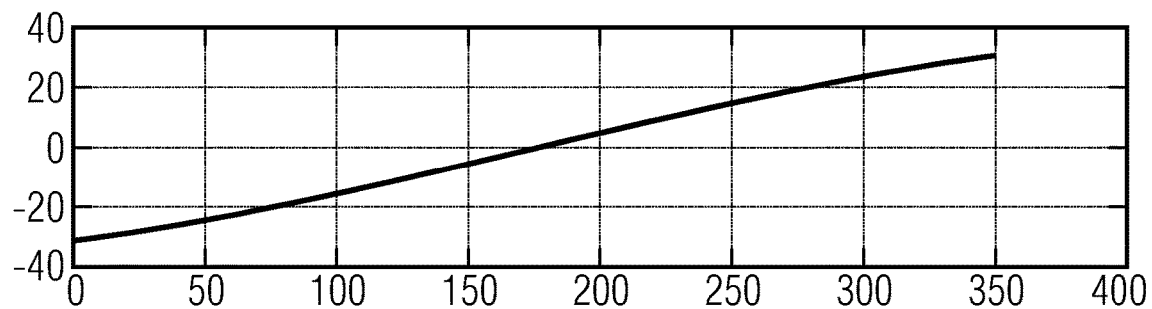
Figure 1C:
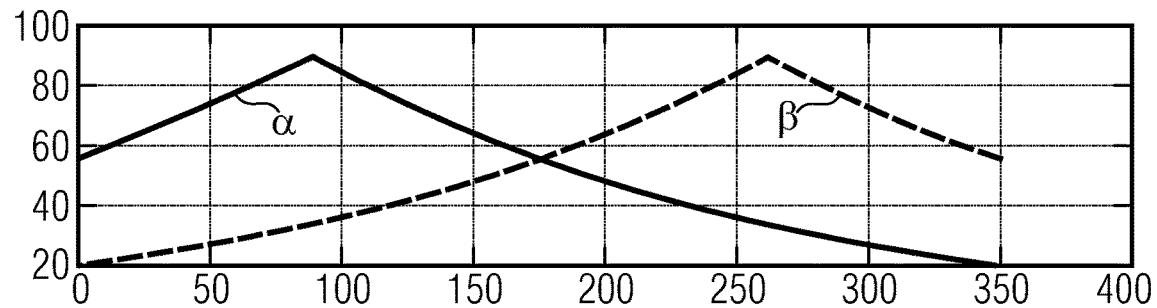
Figure 1D:
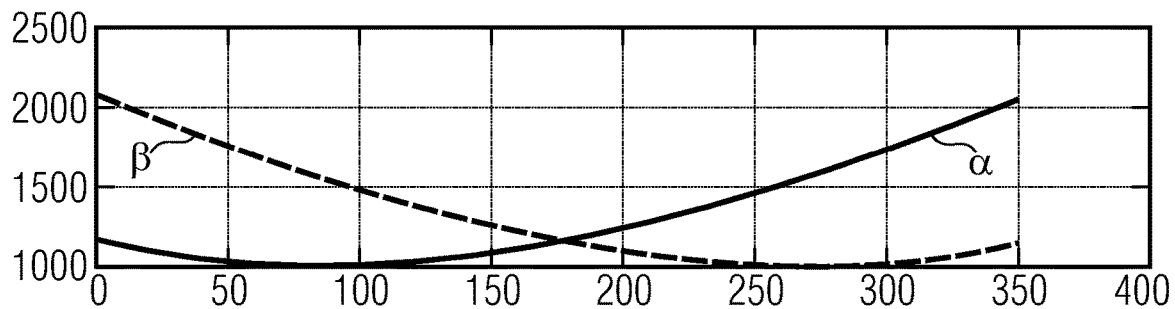
Figure 2:
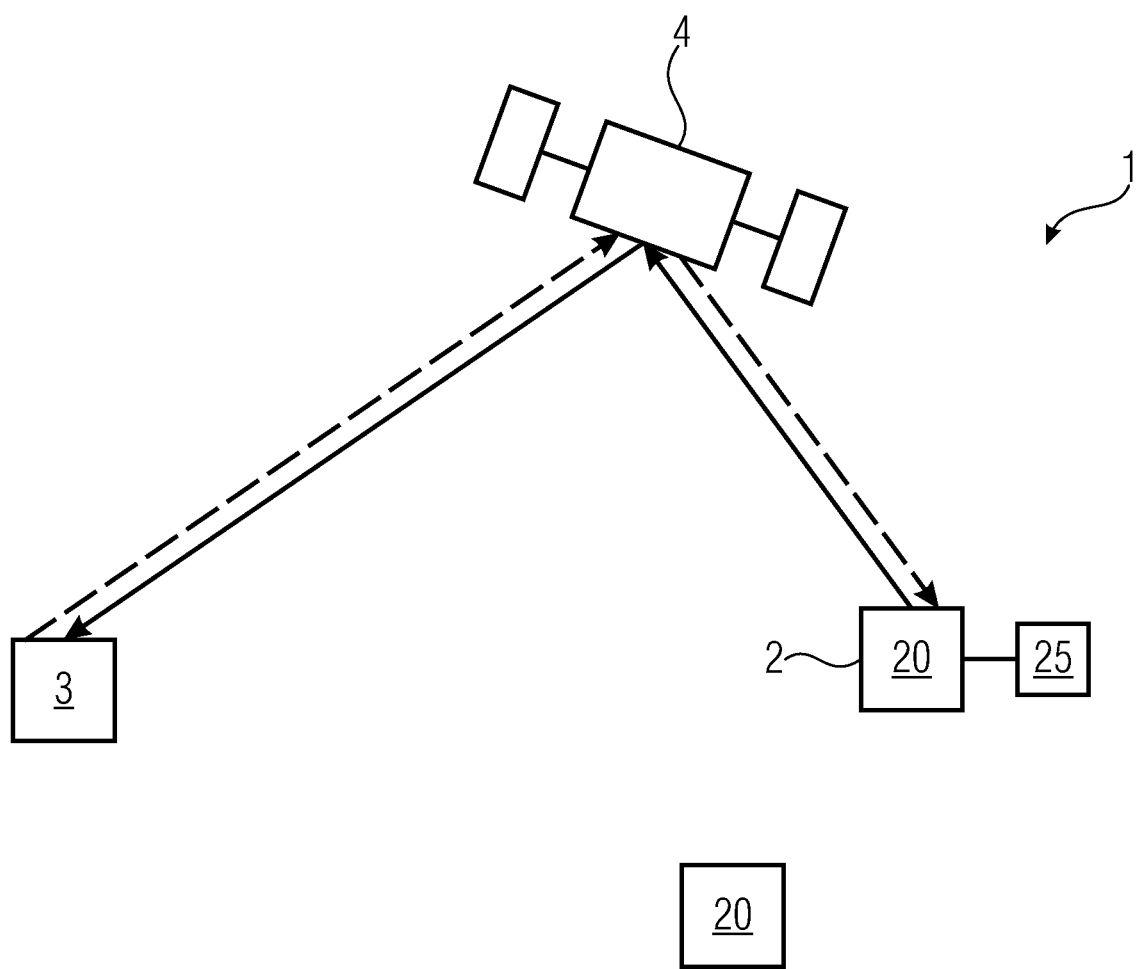
FIG. 2 shows a first embodiment of a wireless communication system.

FIG. 2 shows a first embodiment of a wireless communication system 1.

A user-side-device 2 and a base-station 3 are communicating via a satellite 4 with each other. The user-side-device 2 in the shown embodiment is a user-equipment 20. A further user-equipment 20 is also present. The expression user-equipment refers to any device used directly by an end-user for the communication. Examples are hand-held telephones, laptop computers equipped with a mobile broadband adapter or any other comparable device.

In order to ensure that a signal emitted by the user-equipment 20 reaches the base-station 3 within a specified time slot, the time has to be taken into account needed by the signal for reaching the base-station 3. Hence, a suitable timing-advance-value (TA) has to be used by the user-equipment 20 in order to meet the correct transmission time slot.

In the state of art, the base-station 3 evaluates the travelling time and provides the user-equipment 20 with the corresponding timing-advance-value.

Contrary to this, the base-station 3 according to the invention allows in some embodiments the user-equipment 20 to predict and/or adjust the timing-advance-value on its own.

The base-station 3 sends a satellite-connecting-signal (indicated by the arrows with broken lines) which comprises a granting-signal indicating the user-side-device 2 the allowance to predict and/or adjust the timing-advance-value either for a specified time or for an unlimited time or until a timing-advance-update-request reaches the user-side-device 2 from the base-station 3.

The user-side-device 2 realized here by the user-equipment 20 has access to a data-storage 25 for the adjustment of the timing-advance-value.

In an embodiment, the data-storage 25 allows the user-equipment 20 to store previous, i.e. historical timing-advance-values provided by the base-station 3 in order to deduce a drift of the timing-advance-value and to extrapolate the data. In a different or additional embodiment, data—e.g. in the form of a table—concerning drift-value and/or drift-characteristics are stored within the data-storage 25 and the base-station 3 provides the user-equipment 20—e.g. as a part of the satellite-connecting-signal—with an index indicating which drift-value and/or drift-characteristic the user-equipment 20 has to use for the prediction and/or adjustment of the timing-advance-value.

Hence, the base-station 3 allows the user-equipment 20 to predict and/or adjust the timing-advance-value. The predicted and/or adjusted value is used for synchronizing an uplink and a downlink of the communication implying that the user-equipment 20 sends its signals towards the satellite taking the predicted and/or adjusted value into account.

With other words: A user-side-device 2 receives within a wireless communication system 1 a satellite-connecting-signal. The satellite-connecting-signal comprises a granting-signal. After receiving the granting-signal, the user-side-device 2 predicts and/or adjusts the TA value and uses it for an uplink signal. The user-side-device 2 is here a user-equipment 20 and is in different embodiments an intermediary-device 21 with which various user-equipments 20 are connected.

According to an embodiment, the user-equipment 20 or generally the user-side-device 2 handling the TA value prediction and/or adjustment receives via a downlink TA values or data concerning a drift of the TA value.

Figure 3:
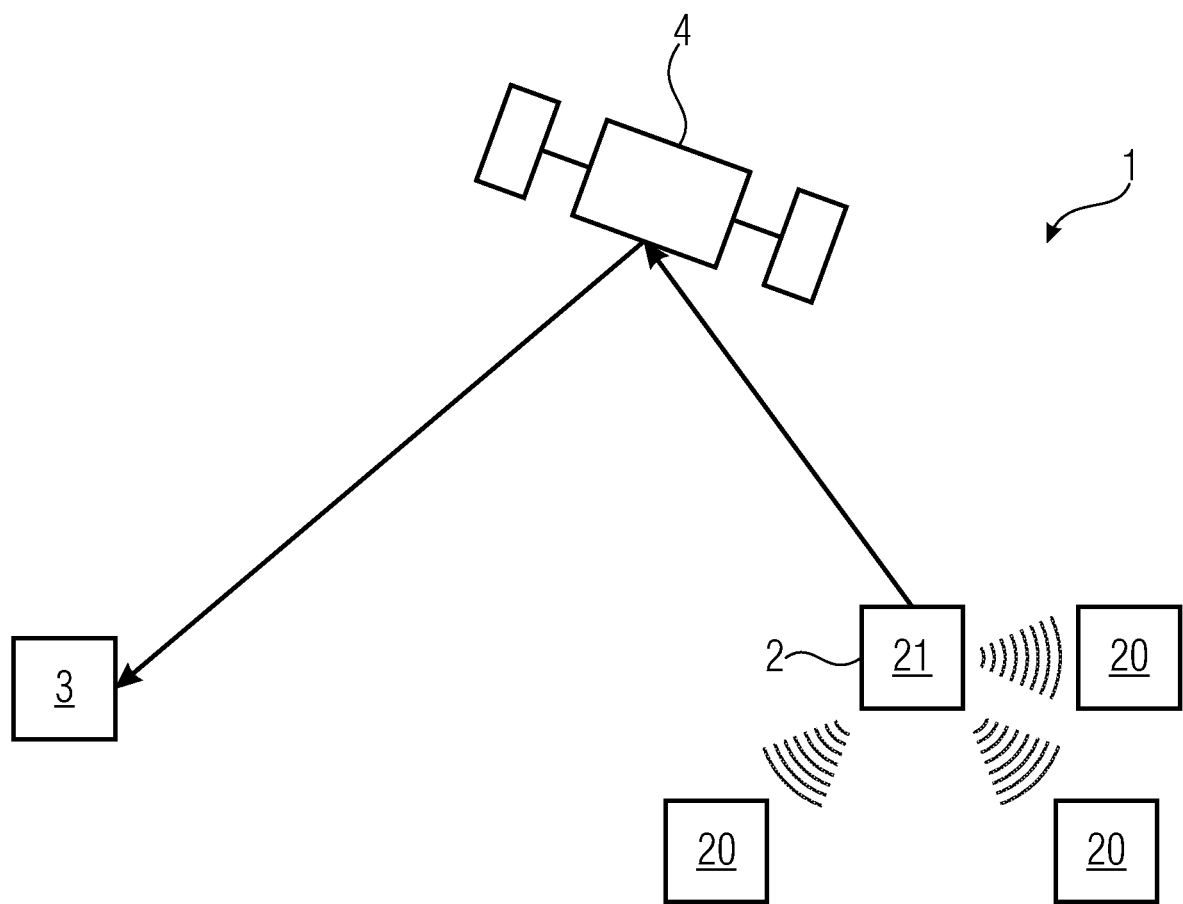
FIG. 3 shows a second embodiment of a wireless communication system.

The embodiment of the wireless communication system 1 shown in FIG. 3 has an intermediary-device 21 as user-side-device 2 handling the communication on the user side with the satellite 4 and via the satellite 4 with the base-station 3. Various user-equipments 20 are connected with the intermediary-device 21.

In an embodiment, the intermediary-device 21 is an alignment-entity that processes the signals stemming from the different user-equipments 20. The intermediary-device 21 predicts and/or adjusts the timing-advance-value and applies it accordingly to the signals before sending the processed signals to the satellite 4.

According to a different embodiment, the intermediary-device 21 serves as a relay. Further, in an embodiment a user-equipment is configured to provide the functionalities of the intermediary-device 21. The user-equipments 20 connected to the intermediary-device 21 are sending their signals to the base-station 3 via the intermediary-device 21. In an embodiment, at least one user-equipment 20 also sends its signals directly via the satellite 4—i.e. without the intermediary-device 21—to the base-station 3. The intermediary-device 21 predicts and/or adjusts the timing-advancevalue and processes the signals based on the predicted and/or adjusted timing-advance-value. For the prediction and/or adjustment, the movements between the intermediary-device 21 and the different user-equipments 20 connected to it and, thus, the different drift values are taken into account by the intermediary-device 21.

In an embodiment, the intermediary-device 21 serving as a relay performs a frequency conversion and/or an amplification of the signals stemming from the connected user-equipments 20 before forwarding the signals to the satellite 4. In an alternative or additional embodiment, the intermediary-device 21 also handles the downlink and submits the respective data or signals to the connected user-equipments 20.

The intermediary-device 21 configured as a relay, provides in an embodiment the connected user-equipments 20 with individually adjusted and/or predicted TA values.

In an embodiment, the intermediary-device 21 provides the user-equipments 20 of a plurality of user-equipments 20 with individual predicted and/or adjusted TA values for a synchronization of the individual uplinks. In an embodiment, the user-equipments 20 use their individual TA values to communicate with the satellite 4.

In an embodiment, the intermediary-device 21 is configured to serve as a relay concerning the upload and/or the download of the connected user-equipments 20 and to serve also as an alignment-entity. In another embodiment, this intermediary-device 21 serving as relay and as alignment-entity is a user-equipment.

The intermediary-device 21 in an embodiment is configured to behave partially as a base-station and/or to execute algorithms of a base-station. In an embodiment, the intermediary-device 21—e.g. being a user-equipment—makes the connected user-equipments 20 to transmit within the time-frequency-resources granted to the relay by the base-station 3. The intermediary-device 21 is sending in an embodiment RA commands towards the connected user-equipments 20 in addition to TA values, so that the local RA and the TA values match together the envisaged total TA value.

Figure 4:
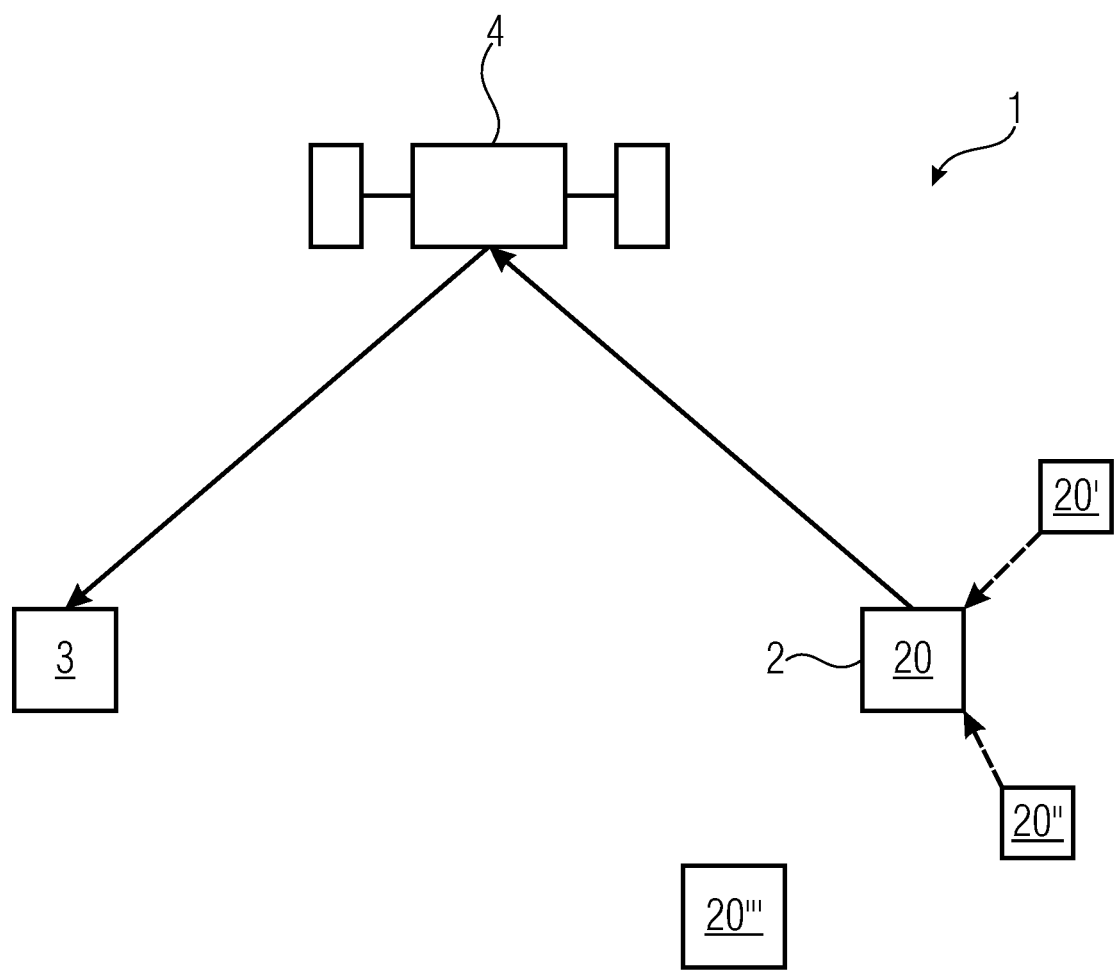
FIG. 4 shows a third embodiment of a wireless communication system.

The wireless communication system 1 shown in FIG. 4 comprises a plurality of user-equipments 20, 20', 20", 20'". After receiving the grant-signal from the base-station 3 one user-equipment 20 receives data concerning the timing-advance-value from the user-equipments 20', 20" (indicated by the arrows with broken lines) in its closer vicinity for the prediction and/or adjustment of the timing-advance-value. One user-equipment 20'" is located farther away and its data are not used for the prediction and/or adjustment of the timing-advance-value.

Figure 5:
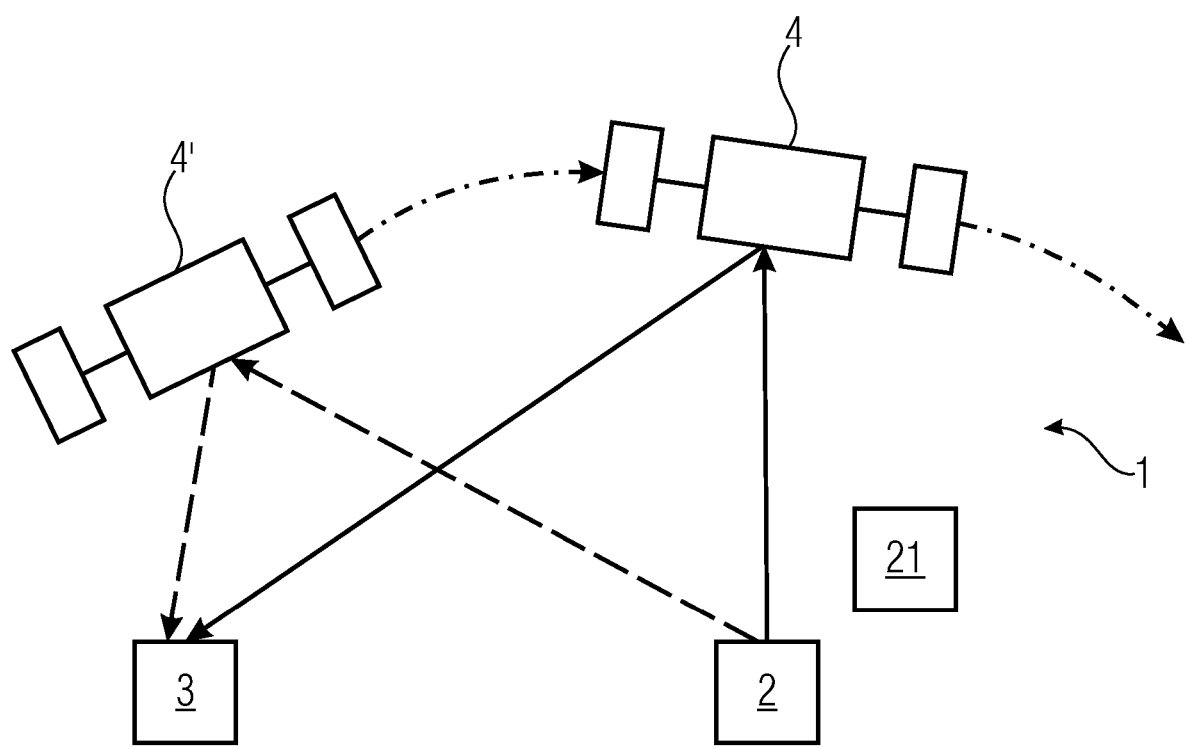
FIG. 5 shows a fourth embodiment of a wireless communication system.

FIG. 5 shows a wireless communication system 1 in which a handover happens.

The base-station 3 and the user-side-device 2 are communicating currently via a satellite 4 that is moving within a suitable distance. The communication is indicated by the solid lines. As the satellite 4 is not geostationary at some time it will leave (indicated by the arrows) this suitable distance and a handover to a different satellite 4' will happen (broken lines for the expected communication).

In order to allow a smooth handover, the base-station 3 submits the satellite-connecting-signal to the user-side-device 2, so that the user-side-device 2 performs the prediction and/or adjustments or preparations that may be useful to switch from the current satellite 4 to the following satellite 4'. More precisely, the base-station 3 sends handover-information comprised by the satellite-connecting-signal to the user-side-device 2 for enabling a prediction and/or adjustment of at least uplink-settings.

The handover-information comprises in an embodiment at least the announcement that a handover will happen. In a different embodiment, the estimated time or time window for the handover is given. The handover-information comprises in one embodiment data that is based on information concerning the current satellite 4 and/or on information concerning the different satellite 4'. This refers e.g. to their characteristics concerning the wireless communication and/or to their path and/or velocity etc.

In some embodiments, the behavior of the user-equipment after the handover is considered. Hence, these embodiments refer especially to the case that a plurality of user-equipments is present and affected by the handover.

According to an embodiment, the handover-information comprises information about a type of initial access/re-access over time following the handover. Hence, there is information about how the new or renewed connection between the user-equipments and the new satellite is realized.

Additionally or alternatively, the handover-information includes information concerning a prioritization of different user-equipments and/or groups of user-equipments and/or services and/or network slices and/or types of communication, i.e. their level concerning the initial access or re-access to the new satellite. The type of communication means the medium access schemes, and/or the waveforms and/or the waveform releases.

Additionally or alternatively, the handover-information comprises information about a method for selecting a start time of an initial access-procedure following the handover. This avoids that all concerned user-equipments start simultaneously or in a too small time window an access-procedure after the handover.

The wireless communication system 1 also comprises an intermediary-device 21 that can also be addressed by the satellite-connecting-signal, when other user-equipments communicate with the base-station 3 via the satellite 4, 4' and the intermediary-device 21. The intermediary-device 21 processes the received signals based on the handover-information.

Figure 6:
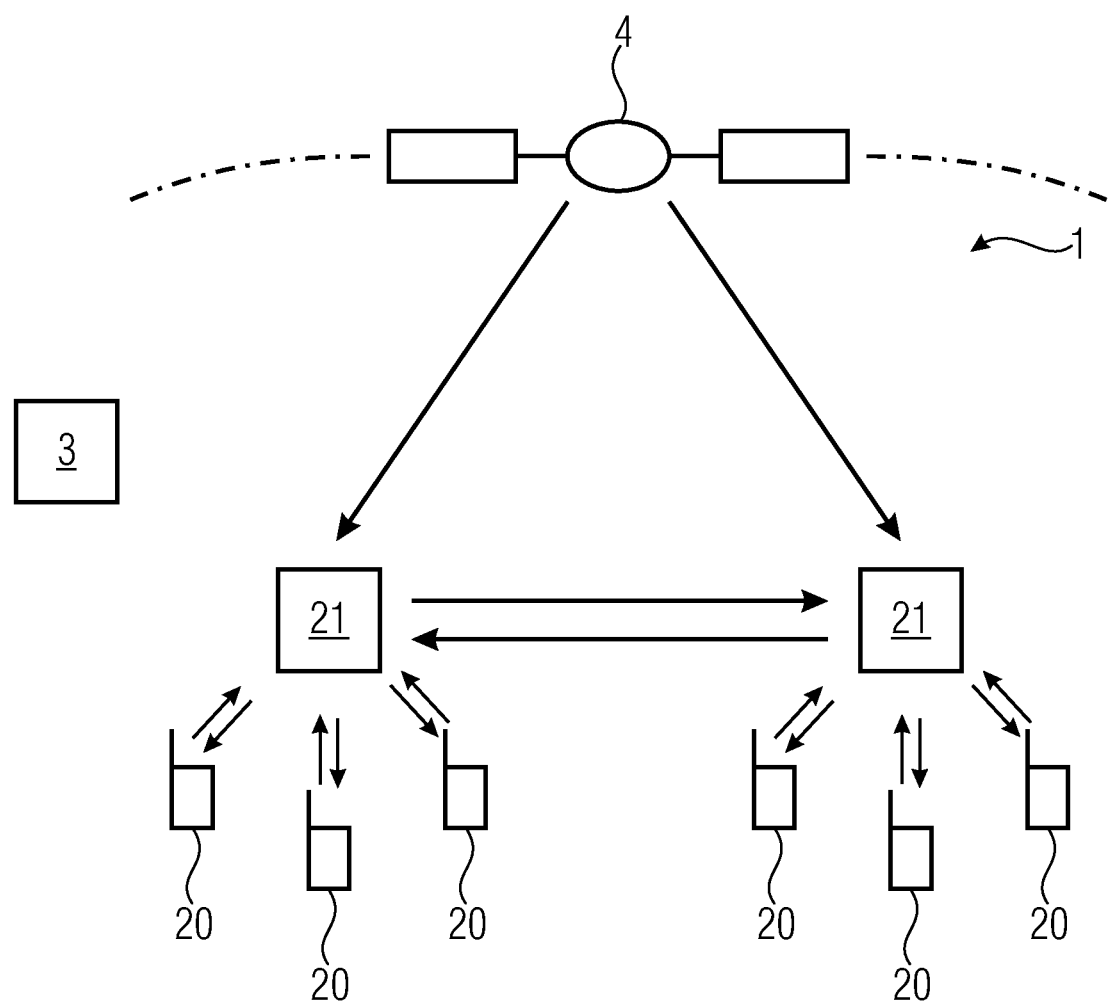
FIG. 6 shows a fifth embodiment of a wireless communication system.

The wireless communication system 1 shown in FIG. 6 comprises two intermediary-devices 21 to which various user-equipments 20 are connected. The user-equipments 20 send to and receive signals and/or data from the respective intermediary-device 21 (indicated by the arrows). The two intermediary-devices 21 are configured to communicate with each other via a sidelink (indicated by the double arrow).

The intermediary-devices 21 serve—depending on the embodiments—as alignment-entities and/or as relays.

The communication allows in an embodiment a mutual coordination between the intermediary-devices 21. According to an embodiment, in case one intermediary-device 21 is unable to receive a downlink signal from the satellite 4, a different intermediary-device 21 can relay the same information over the mentioned sidelink. This refers e.g. to the timing-advance-values or to handover data etc. In a different embodiment, a handover of the user-equipments 20 between the intermediary-devices 21 is performed over the sidelink between the intermediary-devices 21.

Figure 7:
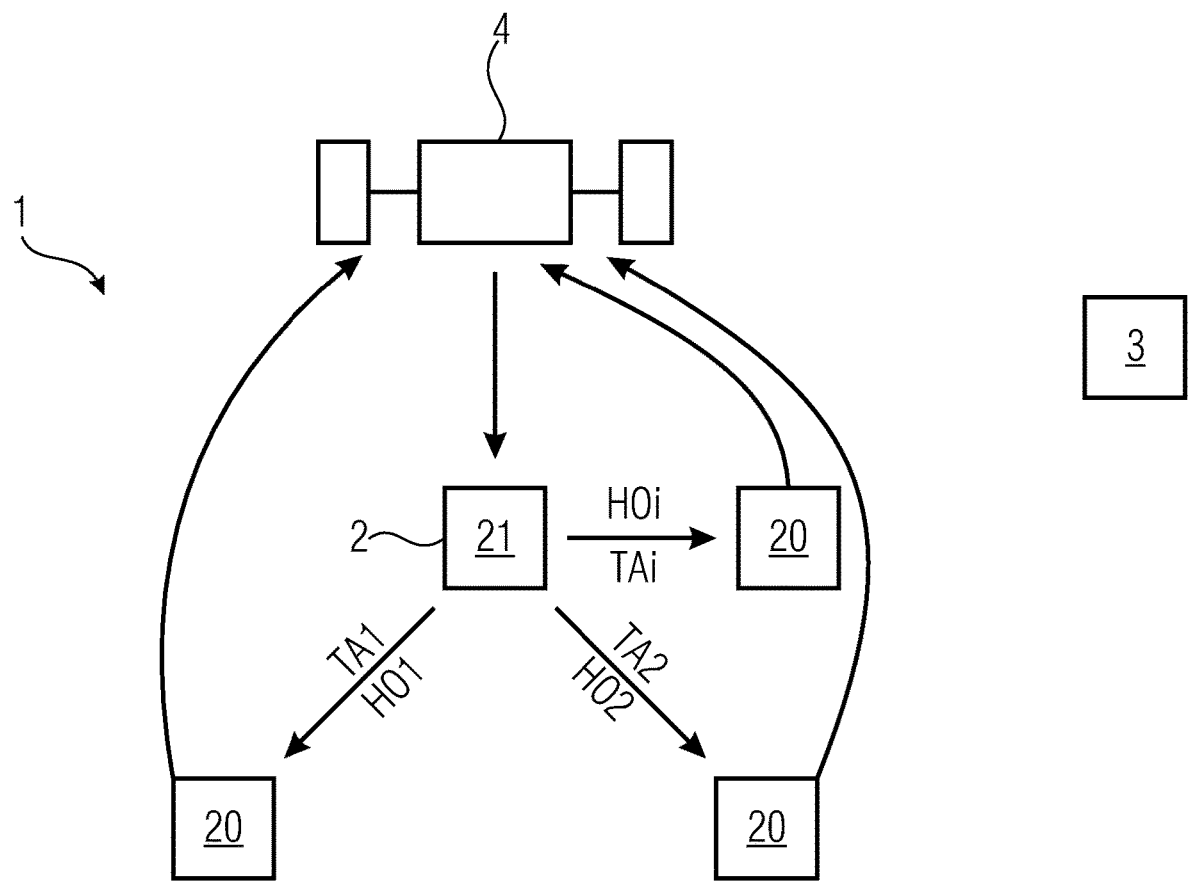
FIG. 7 shows a sixth embodiment of a wireless communication system.

In the embodiment of FIG. 7 an intermediary-device 21 is the user-side-device 2 which receives from a base-station 3 the granting-signal to adjust and/or predict the TA value or the handover-information concerning a handover. Here, the intermediary-device 21 receives via a downlink data concerning a frequency shift and/or the handover-information. Based for example on previous TA values and/or the handover-information and information about the connected user-equipments 20, the intermediary-device 21 calculates individual TA values (TA1, TA2, TAi) and/or handover-information (HO1, HO2, HOi) and provides them to the user-equipments 20.

Using these values or information, the user-equipments 20 perform the uplink towards the satellite on their own. Hence, the intermediary-device 21 does in the shown embodiment not relay of data from the user-equipments 20 towards the satellite 4, it just distributes the alignment data, e.g. TA values, handover-information etc.

Figure 8:
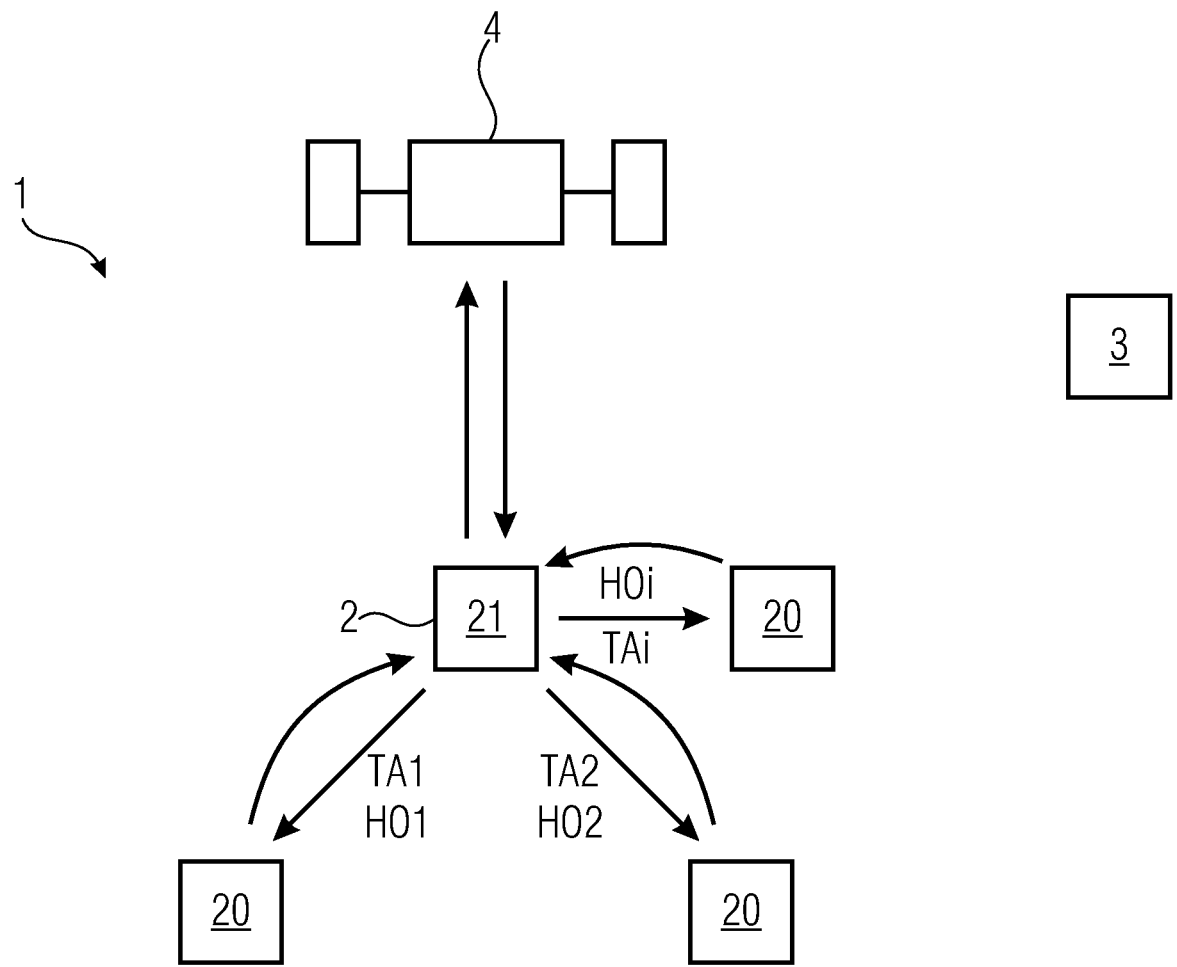
FIG. 8 shows a seventh embodiment of a wireless communication system and FIG. 9 shows an eighth embodiment of a wireless communication system.

The embodiment of FIG. 8 is similar to the embodiment shown in FIG. 7. The main difference is that in the embodiment of FIG. 8, the intermediary-device 21 acts as a relay for the signals of the user-equipments 20. This implies, that the user-equipments 20 only communicate with the satellite 4 and via the satellite 4 with the base-station 3 by the intermediary-device 21. The intermediary-device 21 provides in the shown embodiment the user-equipments 20 with the individual TA values. The individual TA values are updated in an embodiment over time.

In an embodiment, the intermediary-device 21 acts as a quasi-transparent relay to the base-station 3, allowing a coordinated feed forward. In a different embodiment, the intermediary-device 21 acts as a relay-user-equipment looking like a user-equipment to the base-station.

The user-side-equipment 2 is located in an embodiment e.g. on a vehicle or on an airplane. In a different embodiment, it is located on a satellite 4.

Figure 9:
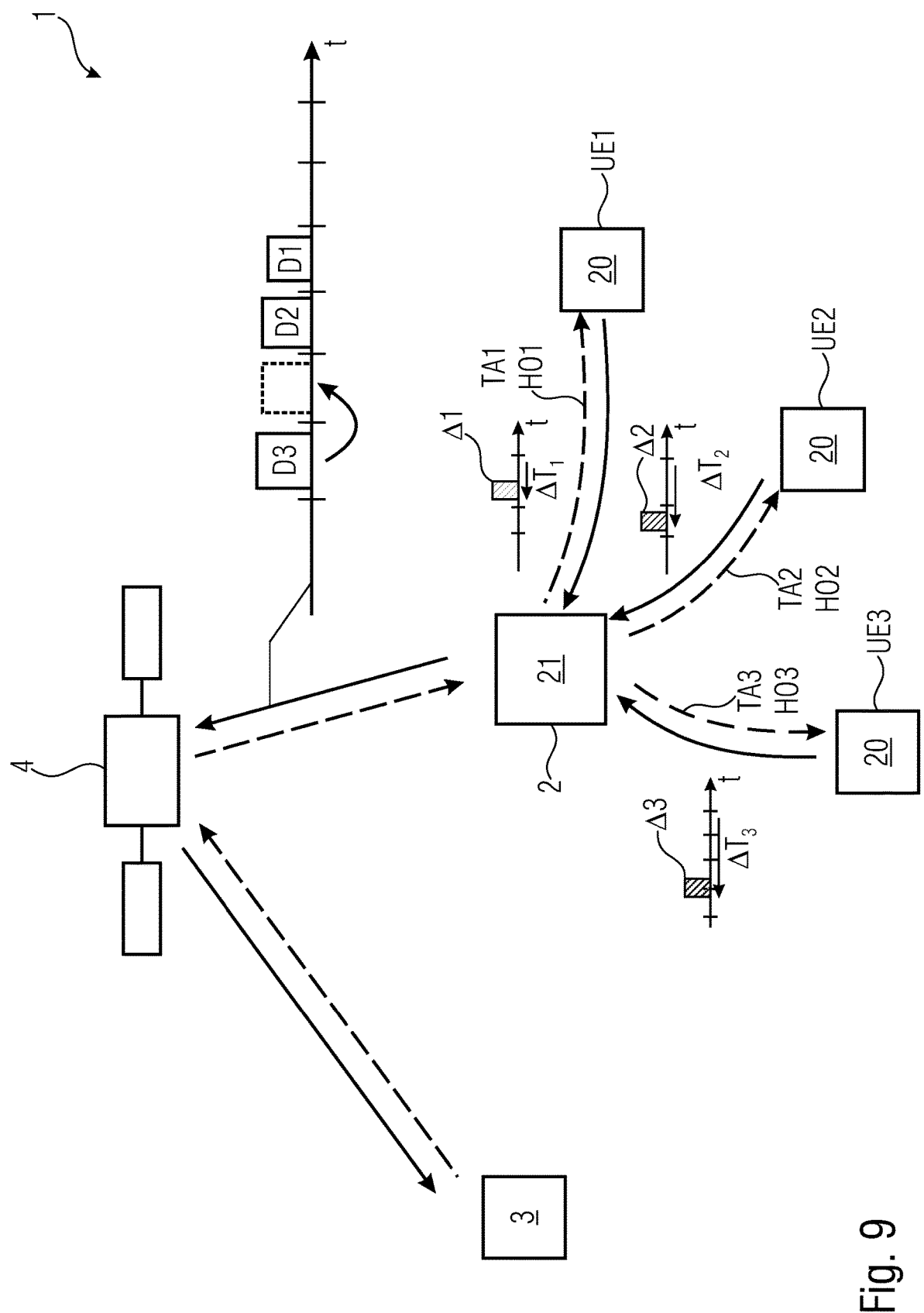

In the embodiment of FIG. 9 three exemplary user-equipments 20, named UE1, UE2, UE3 are connected with an intermediary-device 21 which appears to the base-station 3 to be a user-equipment and is serving as a relay. The intermediary-device 21 receives the signals from the connected user-equipments 20 and performs an uplink towards the satellite 4. The intermediary-device 21 also receives via the satellite 4 a downlink from the base-station 3, e.g. concerning previous TA values or the handover-information. This downlink is the satellite-connecting-signal. The user-equipments 20 receive their individual TA values TA1, TA2, TA3 and—if a handover is expected—the respective handover-information HO1, HO2, HO3.

The user-equipments 20 provide the intermediary-device 21 with their respective data D1, D2, D3 transmitted with a respective time-shift ΔT1, ΔT2, ΔT3 due to the individual TA values.

In an embodiment, the intermediary-device 21 acting as a relay and being a user-equipment forwards the advantageously adapted global and/or total data concerning the timing-advance to the connected user-equipments 20. The global and/or total data refers to all data or to data specific for a group or groups of user-equipments or to individual data. Hence, the intermediary-device 21 either forwards or calculates and distributes the TA values TA1, TA2, TA3 and in case of a handover the handover data HO1, HO2, HO3. The base-station 3 calculates in one embodiment the individual TA values. This embodiment is associated with quite a lot signaling of the satellite.

In an embodiment, the intermediary-device 21 acting as a relay and being a user-equipment looks like a user-equipment to the base-station 3 with a strong traffic demand. The mentioned intermediary-device 21 receives from the base-station 3 a TA value TA0 and handover-information HO0. These values provided by the base-station 3 are in one embodiment global or total values or data. The individual TA values and handover-information are calculated by the intermediary-device 21 based on the data TA0, HO0 provided by the base-station 3. This embodiment is e.g. advantageous for a handover and the following re-access. Hence, the handover and especially the re-access are managed by the relay-user-equipment.

In a further embodiment, the intermediary-device 21 realized by a user-equipment and acting as a relay serves as a buffer. This advantageously happens during a handover. The bufferfunctionality is, for example, provided in the case that the intermediary-device 21 adjusts and/or predicts the individual TA values. The buffer is indicated in the FIG. 9 by the delay of the data D3 of the user-equipment UE3 with the arrow and the data with broken lines within the uplink of the intermediary-device 21 towards the satellite 4.

Possible application fields are:
satellite communication,
long distance cellular cells like large distance communication in rural cells,
aerial platforms (e.g. HAPS) or drones connected to satellites and/or terrestrial cells.

In the embodiments described above, reference has been made to a wireless communication system in which the user-side-device and the base-station communicate with each other via one satellite. However, the present invention is not limited to such embodiments. In accordance with other embodiments, the at least one user-side-device and the base-station communicate with each other via a plurality of satellites and to apply for each satellite a timing-advance-value (TA) for synchronizing an uplink of the communication to the respective satellite. In accordance with the inventive approach, responsive to the granting-signal, the at least one user-side-device is configured to automatically adjust the timing-advance-value (TA) for each satellite for an unlimited time or for a certain period of time, until the at least one user-side-device receives a new TA adjustment configuration.

In the embodiments described above, reference has been made to Carrier Aggregation used by the user-side-device for an uplink using the component carriers, CCs, via a single satellite. However, the present invention is not limited to such embodiments. In accordance with other embodiments the CCs may be employed for establishing a plurality of uplink communication links via a plurality of satellites.

Further, the present invention is not limited to the concept of Carrier Aggregation, and the Timing Advance (TA) adjustments may be performed for a carrier or an aggregated carrier after Carrier Aggregation. In accordance with other embodiments, the concept of bandwidth parts, BWPs, may be employed, and a UE may be configured with up to four carrier bandwidth parts. The TA adjustment does not preclude the adjustments done on one or more BWPs.

According to 38.211-4.4.5, a carrier bandwidth part is defined as a contiguous set of physical resource blocks, selected from a contiguous subset of the common resource blocks for a given numerology (μ) on a given carrier. Carrier bandwidth part may be allocated for the downlink, DL, and the uplink, UL, as follows:

Downlink:
  A UE may be configured with up to four carrier bandwidth parts.
  The bandwidth of each BW may be equal or greater than the Synchronization Signal, SS, Block bandwidth, BW, but it may or may not contain SS Block.
  Only one carrier bandwidth part may be active at a given time.

The UE is not expected to receive the Physical Downlink Shared Channel, PDSCH, the Physical Downlink Control Channel, PDCCH, the Channel State Information Reference Signal, CSI-RS, or the Total Radiated Sensitivity, TRS, outside an active bandwidth part.

Each DL BWP includes at least one Control-resource set, CORESET, with a UE Specific Search Space, USS.

In the primary carrier, at least one of the configured DL BWPs includes one CORESET with common search space, CSS.

Uplink:
A UE may be configured with up to four carrier bandwidth parts.

Only one carrier bandwidth part may be active at a given time.

If a UE is configured with a supplementary uplink, the UE may in addition be configured with up to four carrier bandwidth parts in the supplementary uplink, of which only one carrier bandwidth part may be active at a given time The UE shall not transmit receive the Physical Uplink Shared Channel, PUSCH, or the Physical Uplink Control Channel, PUCCH, outside an active bandwidth part.

Even though multiple (e.g. 4) BWPs may be defined in the DL and in the UL, only one BWP may be active at each specific moment, and mechanisms are provided to select a specific BWP as the active one. According to 38.321-5.15 Bandwidth Part (BWP) operation, BWP selection (or BWP switching) may be done by several different ways as listed below.

By the PDCCH (i.e., the downlink control indicator, DCI): A specific BWP may be activated by a bandwidth part indicator in DCI Format 0_1 (a UL Grant) and DCI Format 0_1 (a DL Schedule).

By the bwp-InactivityTimer: ServingCellConfig.bwp-InactivityTimer

By RRC signaling.

By the MAC entity itself upon initiation of Random Access procedure.

Therefore, in accordance with further embodiments, the user-side-device uses a plurality of component carriers, CCs, or a plurality of bandwidth parts, BWPs to provide for a plurality of uplink communication links. Each of the uplink communication links includes a respective CC or BWP, and the plurality of uplink communication links is via a single satellite or via a plurality of satellites. The UE adjusts the timing-advance-value (TA) in accordance with the embodiments described above, an the TA is adjusted
jointly for all CCs or BWPs when the plurality of uplink communication links are via a single satellite, or
individually for the CCs or BWPs when the plurality of uplink communication links are via a plurality of satellites.

The plurality of communication links may be used in a simultaneous way or in an alternating way.

In the embodiments described above, reference has been made to timing-advance-values or characteristics, like a drift-value, a drift-characteristic or a vector of timing-advance-values, affecting the timing-advance-value (TA) which are stored in a data-storage during an initial access of the user-side-device to the wireless communication system. However, the present invention is not limited to such embodiments. In accordance with other embodiments the timing-advance-values or characteristics, like a drift-value, a drift-characteristic or a vector of timing-advance-values, affecting the timing-advance-value (TA) may also be stored or updated during a refresh of the user-side-device while being in connected state.

In the embodiments described above, reference has been made, in general, to the connection of the user-equipments with the intermediary-device. In accordance with embodiments the user-equipments may be connected with the intermediary-device via a wireless connection or via a wired connection.

In the embodiments described above, reference has been made, in general, to situations in which the least one user-side-device performs an adjustment of the timing-advance-value (TA) for a pre-compensation of a synchronization offset of an uplink when receiving the satellite-connecting-signal including the granting-signal indicating the user-side-device the allowance to adjust the timing-advance-value (TA). The TA value adjustment or prediction, in accordance with embodiments, may be done at any time or during any time period following the receipt of the granting signal. For example, the UE may perform TA prediction over long periods of time or over short periods of time, like in case of short losses of the satellite signal. This condition (a short loss of the satellite signal) may occur during UE mobility, e.g., due to short blockages along the road. In other words, the TA value adjustment or prediction, in accordance with embodiments, may be done, responsive to the granting signal,
once, i.e., the TA value adjustment or prediction is performed only once immediately or with a certain offset in time after receipt of the granting signal, either once at a certain time or once for the duration of a certain time period, or
time-by-time, i.e., the TA value adjustment or prediction is performed at a plurality of certain times or points in time immediately or with a certain offset in time after receipt of the granting signal, or at the certain points in time for a certain duration or time period, or
bursty, i.e., the TA value adjustment or prediction is performed at a plurality of arbitrary or random times or points in time after receipt of the granting signal, or at the arbitrary or random points in time for a certain duration or time period, or
continuous, i.e., the TA value adjustment or prediction is started immediately or with a certain offset in time after receipt of the granting signal, and continues for a certain duration/time period or until receipt of a further signaling to stop the TA value adjustment or prediction.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, one or more of the most important method steps may be executed by such an apparatus.

Depending on certain implementation requirements, embodiments of the invention can be implemented in hardware or in software or at least partially in hardware or at least partially in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitory.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are advantageously performed by any hardware apparatus.

The apparatus described herein may be implemented using a hardware apparatus, or using a computer, or using a combination of a hardware apparatus and a computer.

The methods described herein may be performed using a hardware apparatus, or using a computer, or using a combination of a hardware apparatus and a computer.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. A wireless communication system, comprising:
at least one user-side-device and a base-station,
wherein the at least one user-side-device and the base-station are configured to communicate with each other via a satellite applying a timing-advance-value (TA value) for synchronizing an uplink of communication,
wherein the base-station is configured to provide the at least one user-side-device with a satellite-connecting-signal concerning the uplink towards the satellite, the satellite-connecting-signal providing configuration information in order to establish and adjust the uplink to the satellite,
wherein the at least one user-side-device is configured to perform an adjustment of the timing-advance-value for a pre-compensation of at least one synchronization offset of the uplink in case the at least one user-side-device receives the satellite-connecting-signal, the satellite-connecting-signal comprising a granting-signal indicating the at least one user-side-device an allowance to adjust the timing-advance-value,
wherein, responsive to the granting-signal, the at least one user-side-device is configured to automatically adjust the timing-advance-value on its own for an unlimited time or for a certain period of time, until the at least one user-side-device receives a new TA value adjustment configuration, and
wherein the at least one user-side-device is configured to adjust the timing-advance-value based on one or more of:
historical timing-advance-values,
a drift-value of the timing-advance-value,
a drift-characteristic of the timing-advance-value, and
a vector of timing-advance-values.

2. The wireless communication system of claim 1, wherein, responsive to the granting-signal, the TA value adjustment is
performed at a plurality of certain times or certain points in time immediately or with a certain offset in time after receipt of the granting-signal, or at the certain points in time for a certain duration or time period, or
performed at a plurality of arbitrary or random times or arbitrary or random points in time after receipt of the granting-signal, or at the arbitrary or random points in time for a certain duration or time period, or
started immediately or with a certain offset in time after receipt of the granting-signal, and continues for a certain duration or time period or until receipt of a further signaling to stop the TA value adjustment or prediction.

3. The wireless communication system of claim 1, wherein the at least one user-side-device is configured to predict or adjust the timing-advance-value for a shared uplink among a plurality of pieces of user-equipment.

4. The wireless communication system of claim 1, wherein
the at least one user-side-device comprises a data-storage, and
the at least one user-side-device is configured to adjust the timing-advance-value based on previous timing-advance-values or characteristics affecting the timing-advance-value stored in the data-storage.

5. The wireless communication system of claim 1, wherein the at least one user-side-device is configured to
use a plurality of component carriers, CCs, or a plurality of bandwidth parts, BWPs to provide for a plurality of uplink communication links, each uplink communication link comprising a respective CC or BWP, the plurality of uplink communication links being via a single satellite or via a plurality of satellites,
adjust the timing-advance-value
jointly for all the CCs or BWPs when the plurality of uplink communication links are via the single satellite, or
individually for the CCs or BWPs when the plurality of uplink communication links are via the plurality of satellites, and
use the plurality of uplink communication links in a simultaneous way or in an alternating way.

6. The wireless communication system of claim 5, wherein
an intermediary-device and a user-equipment are combined, or
the intermediary-device is at the satellite with software-defined processing payloads, or
the intermediary-device is comprised by a user-equipment, or
the intermediary-device is a separate unit, or
the intermediary-device is comprised by the satellite.

7. The wireless communication system of claim 1, wherein the at least one user-side-device adjusting the timing-advance-value is a user-equipment.

8. The wireless communication system of claim 1, wherein
the wireless communication system comprises at least one intermediary-device and a plurality of pieces of user-equipment,
the at least one user-side-device adjusting the timing-advance-value is the at least one intermediary-device,
the plurality of pieces of user-equipment are configured to send signals directly to the satellite or via the at least one intermediary-device,
the at least one intermediary-device is configured to serve as an alignment-entity, and
the at least one intermediary-device is configured to align the signals by processing the signals based on the timing-advance-value.

9. The wireless communication system of claim 1, wherein
the wireless communication system comprises at least one intermediary-device and a plurality of pieces of user-equipment,
the at least one user-side-device adjusting the timing-advance-value is the at least one intermediary-device,
the plurality of pieces of user-equipment are connected with the at least one intermediary-device,
the at least one intermediary-device is configured to serve as an alignment-entity, and
the at least one intermediary-device is configured to provide the connected plurality of pieces of user-equipments with the timing-advance-values.

10. The wireless communication system of claim 1, wherein
the wireless communication system comprises at least one user-equipment and an intermediary-device,
the at least one user-side-device adjusting the timing-advance-value is the intermediary-device,
the intermediary-device is configured to serve as a relay, the at least one user-equipment is configured to communicate with the base-station via the intermediary-device, and
the intermediary-device is configured to predict or adjust the timing-advance-value based on a change or relative movement between the intermediary-device and the at least one user-equipment affecting the timing-advance-value.

11. The wireless communication system of claim 10, wherein
the wireless communication system comprises at least one intermediary-device and a plurality of pieces of user-equipment,
the at least one user-side-device predicting or adjusting uplink-settings is the at least one intermediary-device,
the plurality of pieces of user-equipment are configured to send signals to the base-station via the at least one intermediary-device,
the at least one intermediary-device is configured to serve as an alignment-entity, and
the at least one intermediary-device is configured to align the signals with respect to one or more of time, frequency, code and other resources by processing the signals based on handover-information.

12. The wireless communication system of claim 10, wherein
the wireless communication system comprises at least one intermediary-device and a plurality of pieces of user-equipment,
the at least one user-side-device predicting or adjusting uplink-settings is the at least one intermediary-device,
the plurality of pieces of user-equipment are connected with the at least one intermediary-device via a wireless connection or via a wired connection, wherein the at least one intermediary-device is configured to serve as an alignment-entity, and
the at least one intermediary-device is configured to provide the connected plurality of pieces of user-equipment with handover-information.

13. The wireless communication system of claim 1, wherein the at least one user-side-device is configured to predict a movement of the satellite for predicting the timing-advance-value.

14. The wireless communication system of claim 1, wherein the base-station is configured to provide the at least one user-side-device with handover-information comprised by the satellite-connecting-signal concerning a handover from a current satellite to a different satellite, and
wherein the at least one user-side-device is configured to adjust uplink-settings based on the handover-information in case of receiving the handover-information.

15. The wireless communication system of claim 14, wherein the handover-information comprises one or more of:
an announcement of the handover to be expected,
data for the handover based on information concerning the current satellite or the different satellite,
information concerning a prioritization of different pieces of user-equipment or groups of user-equipment or services or network slices or types of communication concerning an initial access/re-access following the handover,
information about allowing collision avoidance of an initial access-procedure or a re-access-procedure following the handover, information about prioritization of the initial access-procedure or re-access-procedure following the handover.

16. A wireless communication system, comprising:
at least one user-side-device and a base-station,
wherein the at least one user-side-device and the base-station are configured to communicate with each other via a satellite applying a timing-advance-value (TA value) for synchronizing an uplink of communication,
wherein the base-station is configured to provide the at least one user-side-device with a satellite-connecting-signal concerning the uplink towards the satellite, the satellite-connecting-signal providing configuration information in order to establish and adjust the uplink to the satellite,
wherein the at least one user-side-device is configured to perform an adjustment of the timing-advance-value for a pre-compensation of at least one synchronization offset of the uplink in case the at least one user-side-device receives the satellite-connecting-signal, the satellite-connecting-signal comprising a granting-signal indicating the at least one user-side-device an allowance to adjust the timing-advance-value,
wherein, responsive to the granting-signal, the at least one user-side-device is configured to automatically adjust the timing-advance-value on its own for an unlimited time or for a certain period of time, until the at least one user-side-device receives a new TA value adjustment configuration,
wherein the at least one user-side-device and the base-station are configured to communicate with each other via a plurality of satellites and to apply for each satellite the timing-advance-value for synchronizing the uplink of the communication to the respective satellite, and
wherein, responsive to the granting-signal, the at least one user-side-device is configured to automatically adjust the timing-advance-value for each satellite for the unlimited time or for the certain period of time, until the at least one user-side-device receives the new TA value adjustment configuration.

17. The wireless communication system of claim 16, wherein
the base-station is configured to provide the at least one user-side-device with data to be stored within a data-storage during an initial access of the at least one user-side-device to the wireless communication system or during a refresh of the at least one user-side-device while being in connected state based on a location of the at least one user-side-device.

18. A wireless communication system, comprising:
at least one user-side-device and a base-station,
wherein the at least one user-side-device and the base-station are configured to communicate with each other via a satellite applying a timing-advance-value (TA value) for synchronizing an uplink of communication,
wherein the base-station is configured to provide the at least one user-side-device with a satellite-connecting-signal concerning the uplink towards the satellite, the satellite-connecting-signal providing configuration information in order to establish and adjust the uplink to the satellite,
wherein the at least one user-side-device is configured to perform an adjustment of the timing-advance-value for a pre-compensation of at least one synchronization offset of the uplink in case the at least one user-side-device receives the satellite-connecting-signal, the satellite-connecting-signal comprising a granting-signal indicating the at least one user-side-device an allowance to adjust the timing-advance-value,
wherein, responsive to the granting-signal, the at least one user-side-device is configured to automatically adjust the timing-advance-value on its own for an unlimited time or for a certain period of time, until the at least one user-side-device receives a new TA value adjustment configuration,
wherein the at least one user-side-device comprises a data-storage,
wherein the at least one user-side-device is configured to adjust the timing-advance-value based on a drift-value, a drift-characteristic or a vector of timing-advance-values stored in the data-storage, and
wherein the base-station is configured to provide the at least one user-side-device with an index indicating which stored drift-value, drift-characteristic or timing-advance-value of the vector of the timing-advance-values is to be used by the at least one user-side-device.

19. A wireless communication system, comprising:
at least one user-side-device and a base-station,
wherein the at least one user-side-device and the base-station are configured to communicate with each other via a satellite applying a timing-advance-value (TA value) for synchronizing an uplink of communication,
wherein the base-station is configured to provide the at least one user-side-device with a satellite-connecting-signal concerning the uplink towards the satellite, the satellite-connecting-signal providing configuration information in order to establish and adjust the uplink to the satellite,
wherein the at least one user-side-device is configured to perform an adjustment of the timing-advance-value for a pre-compensation of at least one synchronization offset of the uplink in case the at least one user-side-device receives the satellite-connecting-signal, the satellite-connecting-signal comprising a granting-signal indicating the at least one user-side-device an allowance to adjust the timing-advance-value,
wherein, responsive to the granting-signal, the at least one user-side-device is configured to automatically adjust the timing-advance-value on its own for an unlimited time or for a certain period of time, until the at least one user-side-device receives a new TA value adjustment configuration,
wherein the at least one user-side-device is configured to
perform Carrier Aggregation for the uplink to use multiple component carriers,
adjust the timing-advance-value jointly for all component carriers when using the Carrier Aggregation, and
use at least one further communication link in a simultaneous or alternating way with a satellite-link signal.

20. A wireless communication system, comprising:
at least one user-side-device and a base-station,
wherein the at least one user-side-device and the base-station are configured to communicate with each other via a satellite applying a timing-advance-value (TA value) for synchronizing an uplink of communication,
wherein the base-station is configured to provide the at least one user-side-device with a satellite-connecting-signal concerning the uplink towards the satellite, the satellite-connecting-signal providing configuration information in order to establish and adjust the uplink to the satellite,
wherein the at least one user-side-device is configured to perform an adjustment of the timing-advance-value for a pre-compensation of at least one synchronization offset of the uplink in case the at least one user-side-device receives the satellite-connecting-signal, the satellite-connecting-signal comprising a granting-signal indicating the at least one user-side-device an allowance to adjust the timing-advance-value,
wherein, responsive to the granting-signal, the at least one user-side-device is configured to automatically adjust the timing-advance-value on its own for an unlimited time or for a certain period of time, until the at least one user-side-device receives a new TA value adjustment configuration,
wherein the at least one user-side-device is configured to
use a plurality of component carriers, CCs, or a plurality of bandwidth parts, BWPs to provide for a plurality of uplink communication links, each uplink communication link comprising a respective CC or BWP, the plurality of uplink communication links being via a single satellite or via a plurality of satellites,
adjust the timing-advance-value
jointly for all the CCs or BWPs when the plurality of uplink communication links are via the single satellite, or
individually for the CCs or BWPs when the plurality of uplink communication links are via the plurality of satellites, and
use the plurality of uplink communication links in a simultaneous way or in an alternating way,
wherein the wireless communication system comprises at least two intermediary-devices,
wherein each of the at least two intermediary-devices is configured to serve as an alignment-entity, and
wherein the at least two intermediary-devices are configured to communicate with each other.

21. A wireless communication system, comprising:
at least one user-side-device and a base-station,
wherein the at least one user-side-device and the base-station are configured to communicate with each other via a satellite applying a timing-advance-value (TA value) for synchronizing an uplink of communication,
wherein the base-station is configured to provide the at least one user-side-device with a satellite-connecting-signal concerning the uplink towards the satellite, the satellite-connecting-signal providing configuration information in order to establish and adjust the uplink to the satellite,
wherein the at least one user-side-device is configured to perform an adjustment of the timing-advance-value for a pre-compensation of at least one synchronization offset of the uplink in case the at least one user-side-device receives the satellite-connecting-signal, the satellite-connecting-signal comprising a granting-signal indicating the at least one user-side-device an allowance to adjust the timing-advance-value,
wherein, responsive to the granting-signal, the at least one user-side-device is configured to automatically adjust the timing-advance-value on its own for an unlimited time or for a certain period of time, until the at least one user-side-device receives a new TA value adjustment configuration,
wherein the wireless communication system comprises at least one user-equipment and an intermediary-device,
wherein the at least one user-side-device adjusting the timing-advance-value is the intermediary-device,
wherein the intermediary-device is configured to serve as a relay,
wherein the at least one user-equipment is configured to communicate with the base-station via the intermediary-device,
wherein the intermediary-device is configured to predict or adjust the timing-advance-value based on a change or relative movement between the intermediary-device and the at least one user-equipment affecting the timing-advance-value, and
wherein the intermediary-device is configured to act as a buffer during a handover by storing at least one transmission time interval of uplink data of the at least one user-equipment.

22. A wireless communication system, comprising
at least one user-side-device and a base-station,
wherein the at least one user-side-device and the base-station are configured to communicate with each other via a satellite applying a timing-advance-value for synchronizing an uplink of communication,
wherein the base-station is configured to provide the at least one user-side-device with a satellite-connecting-signal concerning the uplink towards the satellite, the satellite-connecting-signal providing configuration information in order to establish and adjust the uplink to the satellite,
wherein the at least one user-side-device is configured to adjust the timing-advance-value for a pre-compensation of at least one synchronization offset of the uplink in case the at least one user-side-device receives the satellite-connecting-signal, the satellite-connecting-signal comprising a granting-signal indicating the at least one user-side-device an allowance to adjust the timing-advance-value,
wherein the wireless communication system comprises at least one intermediary-device and a plurality of pieces of user-equipment,
wherein the at least one user-side-device adjusting the timing-advance-value is the at least one intermediary-device,
wherein the plurality of pieces of user-equipment are configured to send signals directly to the satellite or via the at least one intermediary-device,
wherein the at least one intermediary-device is configured to serve as an alignment-entity,
wherein the at least one intermediary-device is configured to align the signals by processing the signals based on the timing-advance-value or by aligning frequency offsets between the signals, and
wherein the at least one user-side-device is configured to adjust the timing-advance-value based on one or more of:
historical timing-advance-values,
a drift-value of the timing-advance-value,
a drift-characteristic of the timing-advance-value, and
a vector of timing-advance-values.

23. A wireless communication system, comprising
at least one user-side-device and a base-station,
wherein the at least one user-side-device and the base-station are configured to communicate with each other via a satellite applying a timing-advance-value for synchronizing an uplink of communication,
wherein the base-station is configured to provide the at least one user-side-device with a satellite-connecting-signal concerning the uplink towards the satellite, the satellite-connecting-signal providing configuration information in order to establish and adjust the uplink to the satellite, and wherein the at least one user-side-device is configured to adjust the timing-advance-value for a pre-compensation of at least one synchronization offset of the uplink in case the at least one user-side-device receives the satellite-connecting-signal, the satellite-connecting-signal comprising a granting-signal indicating the at least one user-side-device an allowance to adjust the timing-advance-value, wherein the wireless communication system comprises at least one intermediary-device and a plurality of pieces of user-equipment, wherein the at least one user-side-device adjusting the timing-advance-value is the at least one intermediary-device, wherein the plurality of pieces of user-equipment are connected with the at least one intermediary-device, wherein the at least one intermediary-device is configured to serve as an alignment-entity, wherein the at least one user-side-device is configured to adjust the timing-advance-value based on one or more of:
historical timing-advance-values,
a drift-value of the timing-advance-value,
a drift-characteristic of the timing-advance-value, and
a vector of timing-advance-values.

24. A wireless communication system, comprising
at least one user-side-device and a base-station,
wherein the at least one user-side-device and the base-station are configured to communicate with each other via a satellite applying a timing-advance-value for synchronizing an uplink of communication,
wherein the base-station is configured to provide the at least one user-side-device with a satellite-connecting-signal concerning the uplink towards the satellite, the satellite-connecting-signal providing configuration information in order to establish and adjust the uplink to the satellite,
wherein the at least one user-side-device is configured to adjust the timing-advance-value for a pre-compensation of at least one synchronization offset of the uplink in case the at least one user-side-device receives the satellite-connecting-signal, the satellite-connecting-signal comprising a granting-signal indicating the at least one user-side-device an allowance to adjust the timing-advance-value,
wherein the wireless communication system comprises at least one user-equipment and an intermediary-device,
wherein the at least one user-side-device predicting or adjusting the timing-advance-value is the intermediary-device,
wherein the intermediary-device is configured to serve as a relay,
wherein the at least one user-equipment is configured to communicate with the base-station via the intermediary-device,
wherein the intermediary-device is configured to predict or adjust the timing-advance-value based on a change or relative movement between the intermediary-device and the at least one user-equipment affecting the timing-advance-value, and
wherein the at least one user-side-device is configured to adjust the timing-advance-value based on one or more of:
historical timing-advance-values,
a drift-value of the timing-advance-value,
a drift-characteristic of the timing-advance-value, and
a vector of timing-advance-values.

25. A wireless communication system, comprising
at least one user-side-device and a base-station,
wherein the at least one user-side-device and the base-station are configured to communicate with each other via a satellite,
wherein the base-station is configured to provide the at least one user-side-device with a satellite-connecting-signal concerning an uplink towards the satellite, the satellite-connecting-signal providing configuration information in order to establish and adjust the uplink to the satellite,
wherein the base-station is configured to provide the at least one user-side-device with handover-information comprised by the satellite-connecting-signal concerning a handover from a current satellite to a different satellite,
wherein the at least one user-side-device is configured to adjust uplink-settings based on the handover-information in case of receiving the handover-information,
wherein the wireless communication system comprises at least one intermediary-device and a plurality of pieces of user-equipment,
wherein the at least one user-side-device adjusting the uplink-settings is the at least one intermediary-device,
wherein the plurality of pieces of user-equipment are configured to send signals to the base-station via the at least one intermediary-device,
wherein the at least one intermediary-device is configured to serve as an alignment-entity,
wherein the at least one intermediary-device is configured to align the signals with respect to time or frequency or code or other resources by processing the signals based on the handover-information, and
wherein the at least one user-side-device is configured to adjust the timing-advance-value based on one or more of:
historical timing-advance-values,
a drift-value of the timing-advance-value,
a drift-characteristic of the timing-advance-value, and
a vector of timing-advance-values.

26. A wireless communication system, comprising
at least one user-side-device and a base-station,
wherein the at least one user-side-device and the base-station are configured to communicate with each other via a satellite,
wherein the base-station is configured to provide the at least one user-side-device with a satellite-connecting-signal concerning an uplink towards the satellite, the satellite-connecting-signal providing configuration information in order to establish and adjust the uplink to the satellite,
wherein the base-station is configured to provide the at least one user-side-device with handover-information comprised by the satellite-connecting-signal concerning a handover from a current satellite to a different satellite,
wherein the at least one user-side-device is configured to adjust uplink-settings based on the handover-information in case of receiving the handover-information,
wherein the wireless communication system comprises at least one intermediary-device and a plurality of pieces of user-equipment,
wherein the at least one user-side-device adjusting the uplink-settings is the at least one intermediary-device,
wherein the plurality of pieces of user-equipment are connected with the at least one intermediary-device, wherein the at least one intermediary-device is configured to serve as an alignment-entity,
wherein the at least one intermediary-device is configured to provide the connected plurality of pieces of user-equipment with the handover-information, and
wherein the at least one user-side-device is configured to adjust the timing-advance-value based on one or more of:
   historical timing-advance-values,
   a drift-value of the timing-advance-value,
   a drift-characteristic of the timing-advance-value, and
   a vector of timing-advance-values.

27. A wireless communication system, comprising
at least one user-side-device and a base-station,
wherein the at least one user-side-device and the base-station are configured to communicate with each other via a satellite,
wherein the base-station is configured to provide the at least one user-side-device with a satellite-connecting-signal concerning an uplink towards the satellite, the satellite-connecting-signal providing configuration information in order to establish and adjust the uplink to the satellite,
wherein the base-station is configured to provide the at least one user-side-device with handover-information comprised by the satellite-connecting-signal concerning a handover from a current satellite to a different satellite,
wherein the at least one user-side-device is configured to adjust uplink-settings based on the handover-information in case of receiving the handover-information,
wherein the wireless communication system comprises at least one user-equipment and an intermediary-device,
wherein the at least one user-equipment is configured to communicate with the base-station via the intermediary-device, and
wherein the intermediary-device is configured to act as a buffer during the handover by storing at least one transmission time interval of uplink data of the at least one user-equipment.

28. A user-side-device, wherein
the user-side-device is configured to communicate with a base-station via a satellite applying a timing-advance-value for synchronizing an uplink of communication,
the user-side-device is configured to receive a satellite-connecting-signal concerning the uplink towards the satellite provided by the base-station, the satellite-connecting-signal providing configuration information in order to establish and adjust the uplink to the satellite,
the user-side-device is configured to perform an adjustment of the timing-advance-value for a pre-compensation of at least one synchronization offset of the uplink in case the satellite-connecting-signal is received, the satellite-connecting-signal comprising a granting-signal indicating the user-side-device an allowance to adjust the timing-advance-value,
responsive to the granting-signal, the user-side-device is configured to automatically adjust the timing-advance-value on its own for an unlimited time or for a certain period of time, until the user-side-device receives a new TA value adjustment configuration, and
wherein the at least one user-side-device is configured to adjust the timing-advance-value based on one or more of:
   historical timing-advance-values,
   a drift-value of the timing-advance-value,
   a drift-characteristic of the timing-advance-value, and
   a vector of timing-advance-values.

29. A base-station, wherein
the base-station is configured to communicate with at least one user-side-device via a satellite applying a timing-advance-value for synchronizing an uplink of communication,
the base-station is configured to provide the at least one user-side-device with a satellite-connecting-signal concerning the uplink towards the satellite, the satellite-connecting-signal providing configuration information in order to establish and adjust the uplink to the satellite, and
the satellite-connecting-signal comprising a granting-signal indicating the at least one user-side-device an allowance to adjust the timing-advance-value automatically on its own for an unlimited time or for a certain period of time, until the at least one user-side-device receives a new TA value adjustment configuration, and
wherein the at least one user-side-device is configured to adjust the timing-advance-value based on one or more of:
   historical timing-advance-values,
   a drift-value of the timing-advance-value,
   a drift-characteristic of the timing-advance-value, and
   a vector of timing-advance-values.

30. A method for handling wireless communication between at least one user-side-device and a base-station via a satellite, comprising:
providing the at least one user-side-device with a satellite-connecting-signal concerning an uplink towards the satellite, the satellite-connecting-signal providing configuration information in order to establish and adjust the uplink to the satellite, and
performing an adjustment of a timing-advance-value for a pre-compensation of at least one synchronization offset of the uplink from the at least one user-side-device via the satellite to the base-station in case the at least one user-side-device receives the satellite-connecting-signal, the satellite-connecting-signal comprising a granting-signal indicating the at least one user-side-device an allowance to adjust the timing-advance-value,
wherein, responsive to the granting-signal, the at least one user-side-device automatically adjusts the timing-advance-value on its own for an unlimited time or for a certain period of time, until the at least one user-side-device receives a new TA value adjustment configuration, and
wherein the at least one user-side-device is configured to adjust the timing-advance-value based on one or more of:
   historical timing-advance-values,
   a drift-value of the timing-advance-value,
   a drift-characteristic of the timing-advance-value, and
   a vector of timing-advance-values.

* * * * *